(12) United States Patent
Ramsland

(10) Patent No.: US 8,708,654 B2
(45) Date of Patent: Apr. 29, 2014

(54) HORIZONTAL AXIS WIND TURBINE WITH BALL-AND-SOCKET HUB

(76) Inventor: Arnold Ramsland, Chatham, NJ (US)

( * ) Notice: Subject to any disclaimer, the term of this patent is extended or adjusted under 35 U.S.C. 154(b) by 424 days.

(21) Appl. No.: 13/137,458

(22) Filed: Aug. 17, 2011

(65) Prior Publication Data

US 2013/0045101 A1 Feb. 21, 2013

(51) Int. Cl.
*F03D 1/06* (2006.01)
(52) U.S. Cl.
USPC ............................. 416/148; 416/41; 416/140
(58) Field of Classification Search
USPC ........... 416/31, 40, 41, 44, 53, 140, 147, 148, 416/149, 155, 244 R
See application file for complete search history.

(56) References Cited

U.S. PATENT DOCUMENTS

| | | | |
|---|---|---|---|
| 2008/0304969 A1* | 12/2008 | Fu | 416/148 |
| 2012/0070286 A1* | 3/2012 | Carter | 416/44 |
| 2012/0070304 A1* | 3/2012 | Nielsen et al. | 416/244 R |
| 2012/0099993 A1* | 4/2012 | Guerenbourg et al. | 416/174 |

* cited by examiner

*Primary Examiner* — Ned Landrum
*Assistant Examiner* — Justin Seabe

(57) ABSTRACT

A horizontal axis wind turbine with a ball-and-socket hub is disclosed. The hub provides for a second vertical axis, the hub axis, intersecting the center of the hub that enables a change in orientation of the rotor axis without changing the orientation of the main shaft axis. The cause for the rotation around the hub axis is an imbalance in torque applied by the blades across a wind shear axis due to a gradient in wind velocity. Rotation around the hub axis will continue until back-and-forth rotation of the blades is such that the torque is balanced across a wind shear axis and the rotor axis is set at an optimal angle. As changes in wind direction occur, the torque will become imbalanced, and the hub will rotate until a new optimal angle is achieved. The present turbine design allows for the hub to freely rotate ±20° around the hub axis and continuously maintain orientation of the rotor axis at an optimal angle. When a control limit is reached, a computer signals the yaw axis motor to rotate the main shaft axis until it is aligned with the rotor axis. Laser measuring devices and linear actuators located in the front of the nacelle provide for monitoring and control of the hub movement.

13 Claims, 21 Drawing Sheets

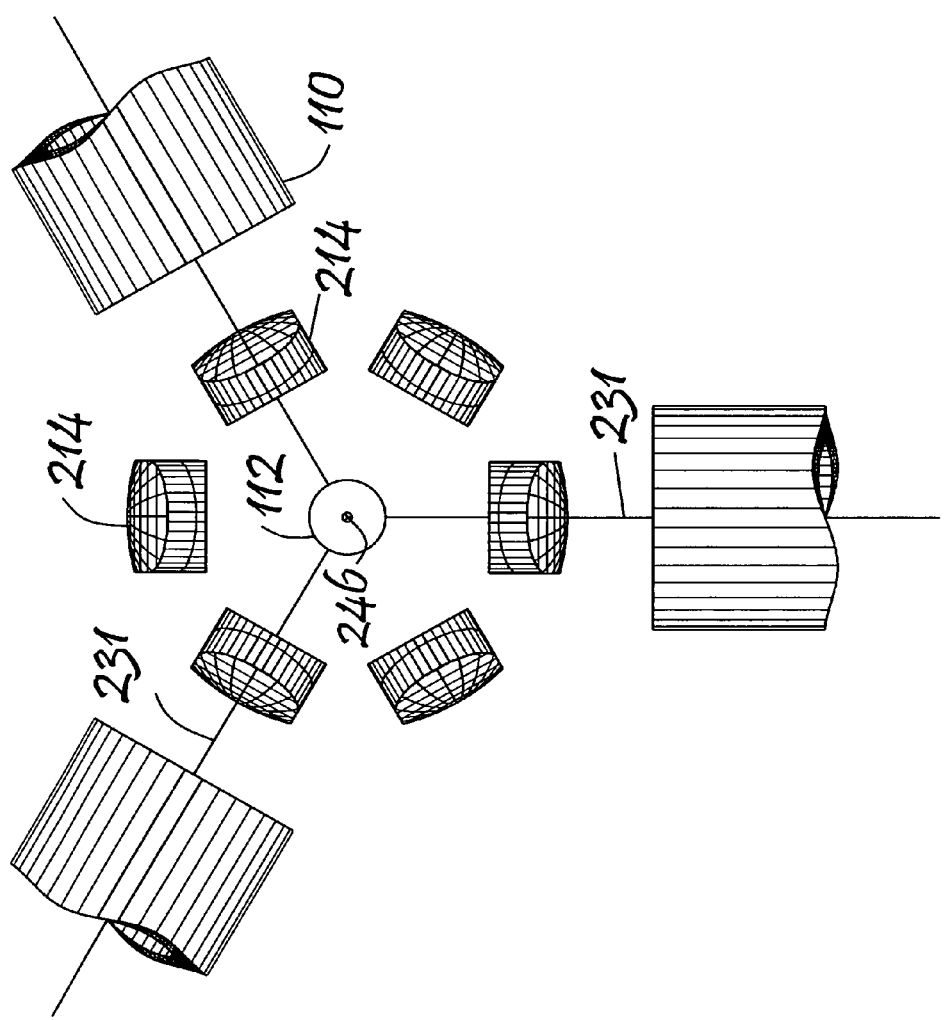

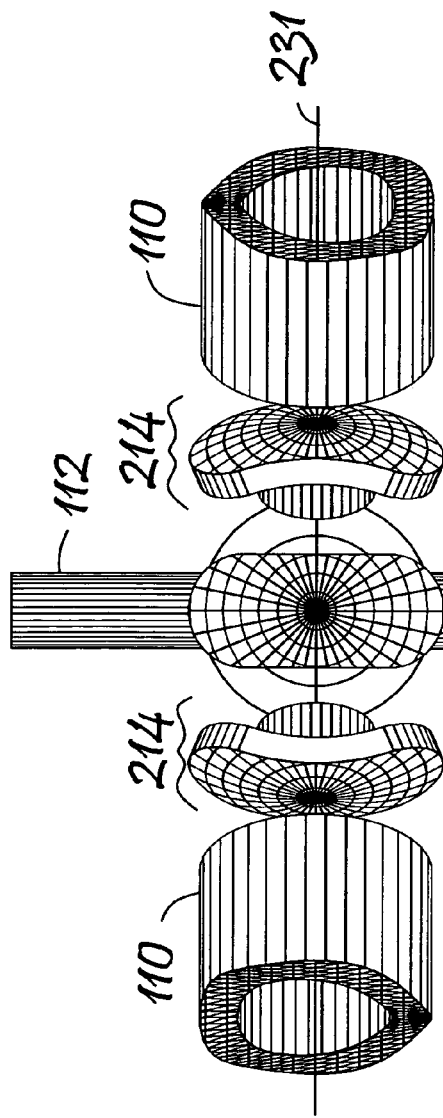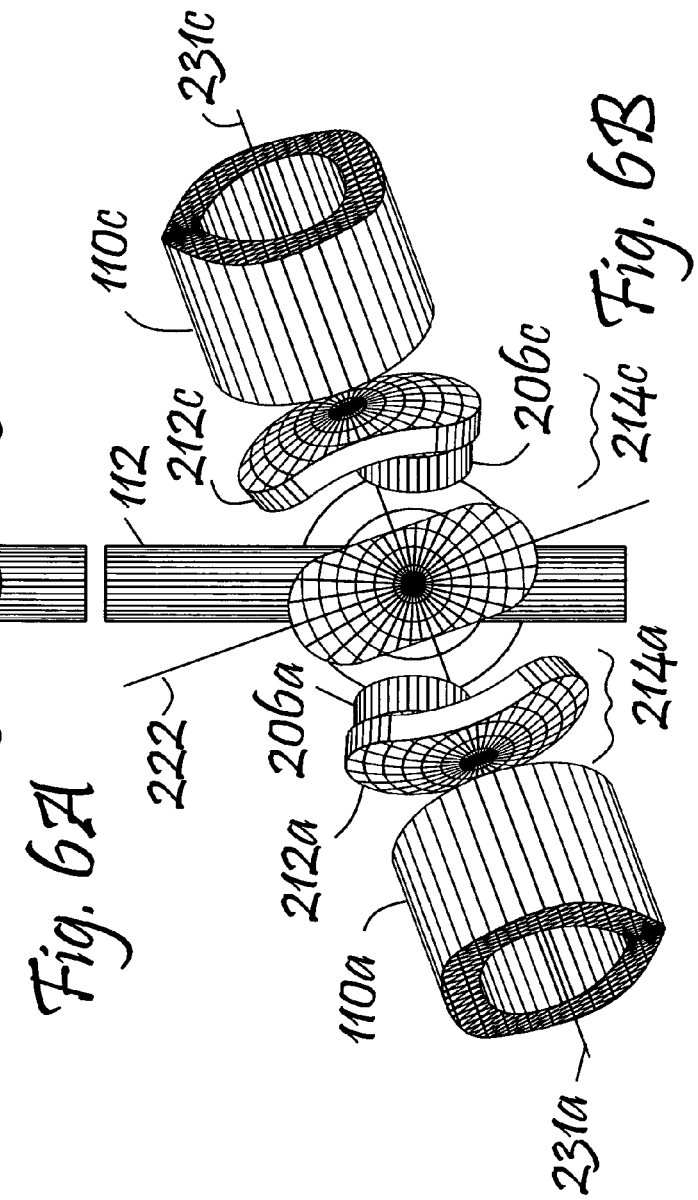

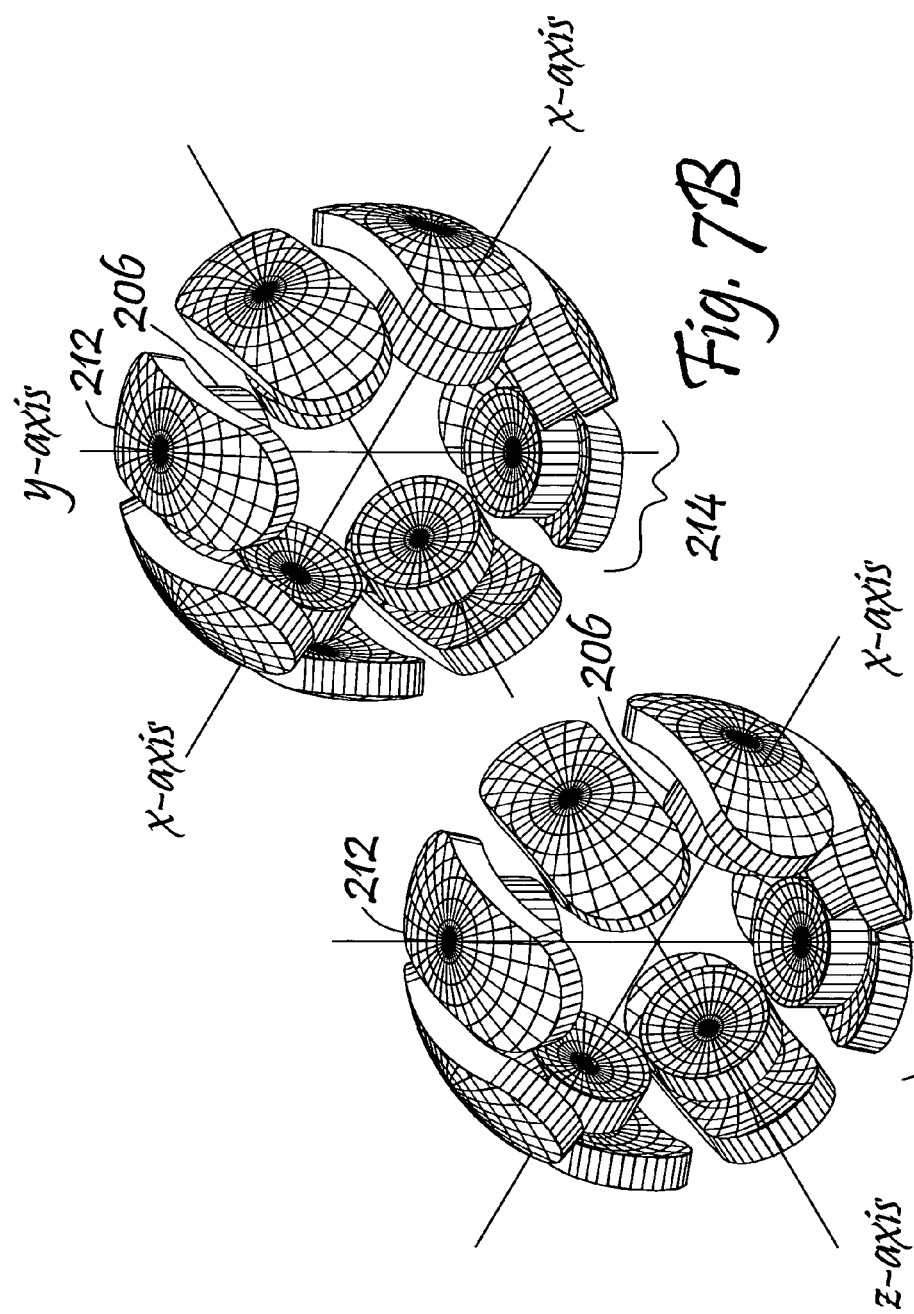

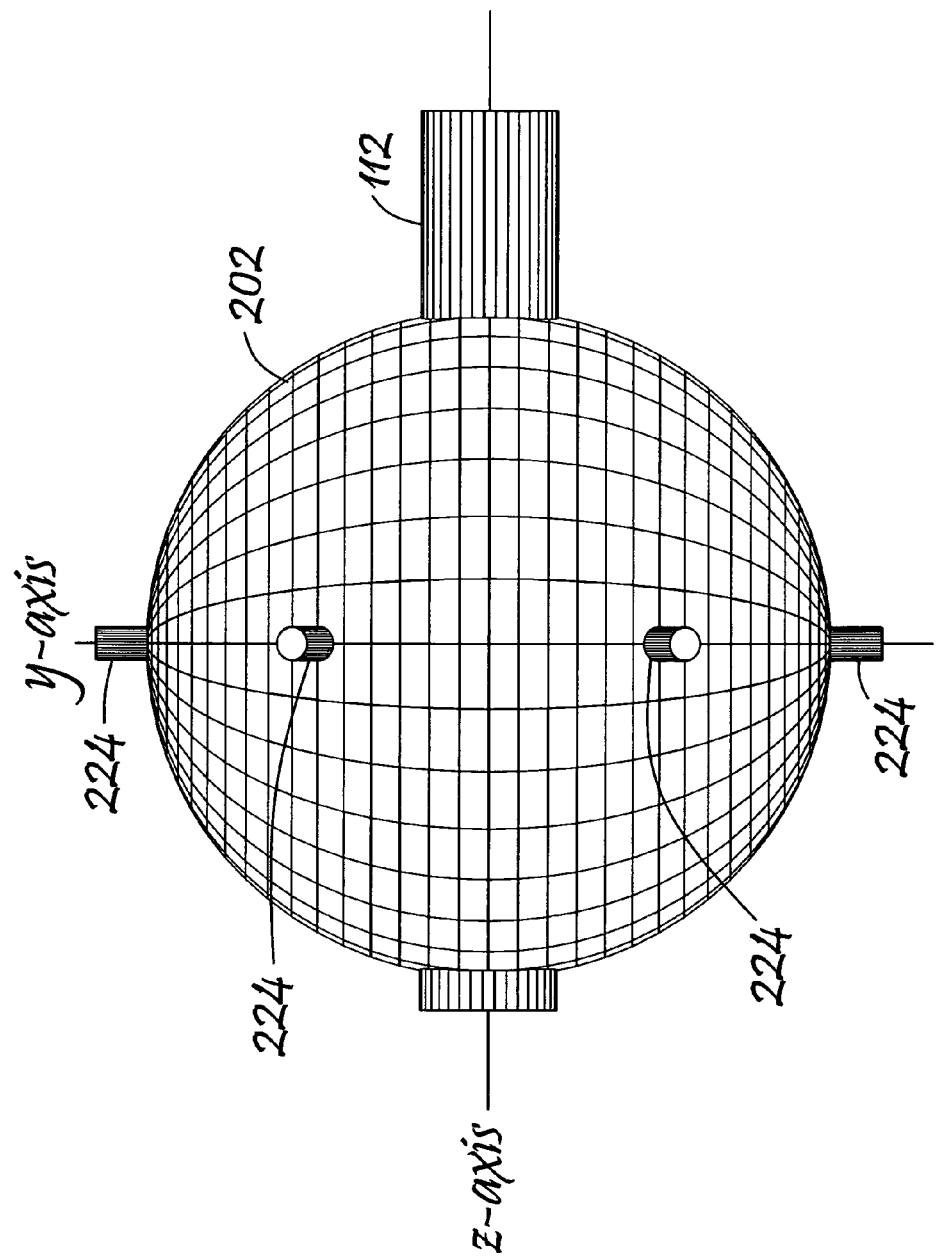

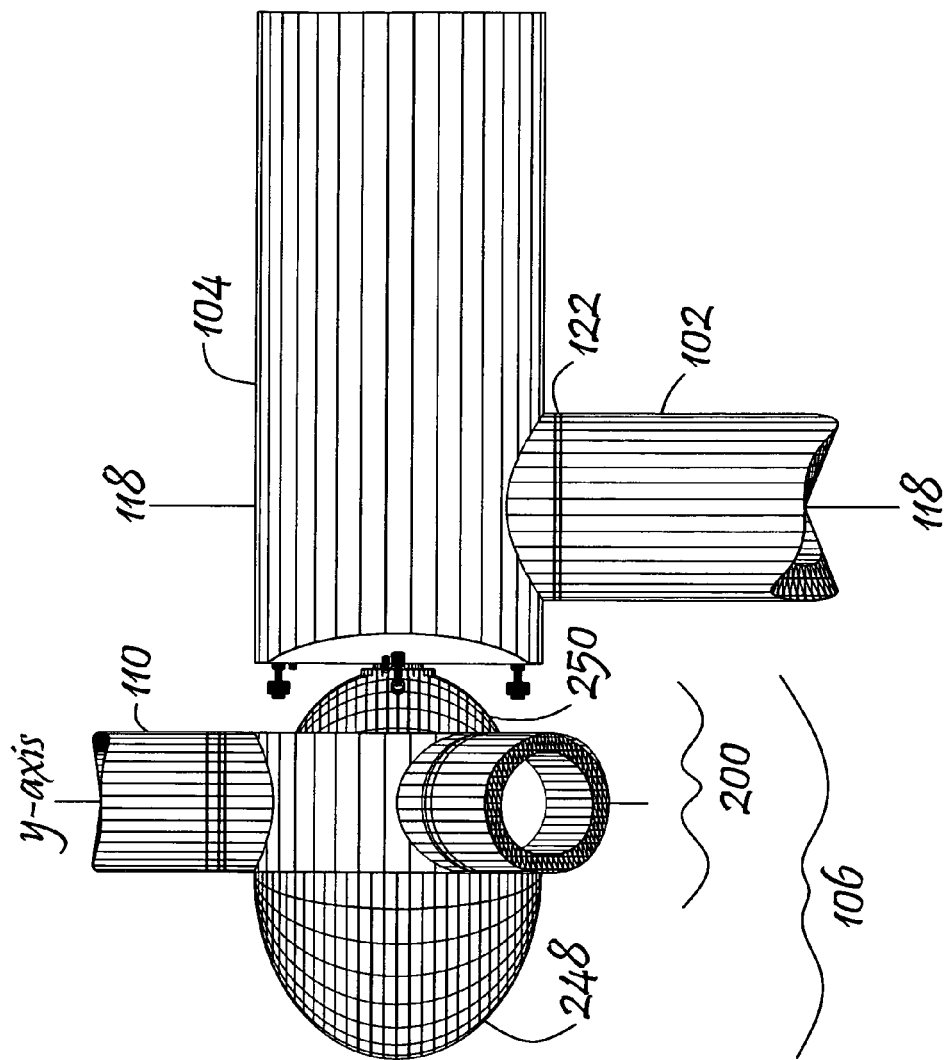

HORIZONTAL AXIS WIND TURBINE WITH BALL-AND-SOCKET HUB

BACKGROUND OF THE INVENTION

The present invention relates to the field of wind turbine generators, and more particularly to the field of horizontal-axis wind turbines. One of the principal problems involved in designing horizontal axis wind turbines is wind shear, which is the variation of wind velocity with height above ground level. Wind velocities tend to increase with altitude due to aerodynamic surface drag and the viscosity of air. As a result, turbine blades at the top of the rotation experience higher wind velocities than blades at the bottom of the rotation. If not compensated for in the design of the wind turbine, this vertical wind velocity gradient will both degrade the performance and efficiency of the wind turbine and subject it to damaging stresses.

In addition to wind shear due to natural differences in wind velocity with altitude, wind shear can also be induced by improper alignment of the main shaft axis, i.e., not facing the axis at the optimal angle with respect to the wind direction. Most often, improper alignment results from changes in wind direction. If there is no wind shear, the rotor axis (the axis around which the blades are rotating) should face directly into the wind so that all blades will experience the same wind speed. If however, the main shaft axis is aligned obliquely to the wind in one direction, blades at the top of the rotation will move into the wind, and blades at the bottom of the rotation will move with the wind. This will cause blades at the top of the rotation to experience a greater effective wind speed than blades at the bottom. Conversely, if the orientation of the main shaft is oblique to the wind in the opposite direction, blades at the bottom of the rotation will experience a greater effective wind speed than those at the top.

Of vital importance in the design of wind turbine generators is operation of the turbine blades at the optimum tip speed ratio to extract as much power as possible out of the wind. Tip speed ratio is defined as the speed at the tips of the turbine blades divided by the speed of the wind. For example, if the wind is blowing at 20 mph and the blade tips are rotating at 100 mph, then the tip speed ratio is 5. If however, there is a wind velocity difference of 10 mph between the lowest and highest blade positions, the tip speed ratio will vary from 4 to about 7, thereby diverging from the optimum design point with consequent loss of efficiency. Variations in tip speed ratio due to wind shear also cause changes in the angle of attack of the turbine blades, which depends on the speed of the blades relative to the wind speed. The effect is to increase the angle of attack at the top of the blade's path and decrease it at the bottom. In the above example, the angle of attack will be increased by almost 3 degrees at the top and decreased by almost 3 degrees at the bottom. This can result in stall at the top and reduced lift power at the bottom.

The lift generated by turbine blades during rotation is applied both in the direction of rotation and in a backward direction. Forces applied in the direction of rotation are also designated as in-plane forces and forces applied in a backward direction are also designated as out-of-plant forces. These backward forces are usually substantially greater than the forces applied in the direction of rotation. Because of this, wind shear will cause more backward force to be applied to blades experiencing the greater effective wind speed. The stress produced by this unbalance in backward forces is augmented by the concomitant changes in the angle of attack of the blades. This cyclical stress on the blades and bearings can cause excessive wear, maintenance problems, and shorten the useful life of the wind turbine generator.

The prior art in this field has responded to the problems presented by wind shear through the use of a "teeter pin" that is part of the hub. A teeter pin provides for an additional degree of freedom by enabling the turbine rotor to pivot back-and-forth like a playground seesaw. The addition of the teeter pin causes a backward force to be converted to backward torque. This back-and-forth rotation results in a balancing of the torque on the blades around the teeter axis because blades experiencing the higher wind velocity move with the wind and blades experiencing the lower wind velocity move into the wind. Such teeter pins are useful as applied to two-bladed wind turbines, as they allow the upper blade to tilt backward while the lower blade tilts forward. Thus, the teetering motion of a two-bladed wind turbine tends to equalize the effective wind speeds for both blades, thereby maintaining a constant tip speed ratio. Teetering also tends to equalize the backward torque on both blades, thereby reducing shear stresses.

The limited seesaw pivoting enabled by teeter pins is, however, inadequate to compensate for wind shear in turbines having three or more blades. This is because teetering is limited to one blade moving forward and the other moving backward in an equal and opposite manner. The concept of the present invention is to provide a ball-and-socket hub that enables back-and-forth rotation of blades for turbines having two or more blades. The center of the ball-and-socket hub is defined as the origin of x, y and z axes. As shown in FIG. 2A, the y-axis is parallel to the yaw axis, through which the nacelle rotates about the tower to change the orientation of the rotor with respect to the wind. The z-axis is aligned with the main shaft axis and generally with the direction of the wind, and the x-axis is aligned horizontally and roughly parallel to the ground.

The hub has a series of dynamic rotational couplers between the ball and socket that rotationally couples the ball and socket around the z-axis so that rotational torque generated by the turbine blades is transferred from the socket to the ball. In addition the dynamic rotational couplers enable the socket to move back-and-forth with respect to the ball in response to the back-and-forth rotation of the blades. This back-and-forth rotation provides an additional degree of freedom.

The back-and-forth rotation of the blades exhibits a cyclic pattern that is dependent upon the gradient in wind speed. For example, again referring to FIG. 2A, if blades are rotating clockwise around the rotor axis (as viewed from the front), and there is a vertical gradient in wind velocity, blades will start to rotate backward around the x-axis due to higher wind speed starting at the 180° position and continue rotating backward a until reaching the maximum backward position at 0°. Then the blades will begin to rotate forward due to lower wind velocity until the maximum forward position is reached at 180°. The term "wind shear axis" is used to describe an axis which is perpendicular to the gradient in wind shear, such that the maximum forward and maximum backward rotation positions occur along the wind shear axis. In the above example, the x-axis is the wind shear axis. This rotation of the blades around the wind shear axis causes a rotation of the hub socket around the hub axis, which is perpendicular to the wind shear axis. In the above example, the hub axis is the y-axis. The hub axis is not a physical axis such as the teetering axis, but rather a virtual axis created by rotation of the socket around the ball. The hub axis is perpendicular to the rotor axis and to the wind shear axis, and can be any axis in the x-y plane that intersects the origin of the x, y, and z axes. The rotation of the hub socket around the hub axis is not a separate degree of freedom, but rather a necessary outcome imposed by the geometry of the ball-and-socket. The extent of rotation around the hub axis is determined by the extent of back-and-forth rotation of the blades.

FIGS. 2B and 2C show the relationship between the back-and-forth rotation of the blades around the wind shear axis 233 and the resulting rotation of the rotor axis 222 around the tub axis 235.

As with teetering, the back-and-forth rotation of the blades occurs in order to balance torque on the blades. This balance occurs across the wind shear axis, e.g., the x-axis. Each blade applies a torque around the wind shear axis based upon the backward force multiplied by the distance from the wind shear axis. When the back-and-forth rotations are such that the torque contributions above and below the wind shear axis are balanced, the back-and-forth rotations will reach a steady state. At this time, the rotation of the hub socket around the hub axis will stop and the angle where it stops becomes the optimal hub angle (the angle between the rotor axis and the main shaft axis). In cases where there is no wind shear, the rotor axis will point directly into the wind. Otherwise, the rotation of the hub socket around the hub axis will orient the rotor axis obliquely into the wind and create rotations that largely offset the wind shear. As changes in wind direction occur, the blade torque above and below the wind shear axis will become unbalanced and cause the extent of the back-and-forth rotations to change. This change will in turn cause the hub socket to rotate around the hub axis until a new optimal hub angle is achieved.

Since the hub axis is perpendicular to the rotor axis, rotation of the hub socket around the hub axis will cause a change in orientation of the rotor axis. This change in orientation of the rotor axis, however, does not affect the orientation of the main shaft axis which remains fixed along the z-axis. An essential consequence of this change in orientation of the rotor axis is that the blades retain rotational symmetry and thus balance the forces of the rotor with respect to both the rotor axis and the main shaft axis. The central feature of the present invention, the ball-and-socket hub, will now be described in further detail.

SUMMARY OF THE INVENTION

Definition of Axes used in Summary

Main Shaft Axis: the axis of rotation of the main shaft and main shaft ball. The main shaft axis is the z-axis.

Rotor Axis: the axis of rotation of the hub socket, outer hub, and blades which comprise the rotor. The rotor axis is perpendicular to the hub axis and determines the orientation of the rotor.

Wind Shear Axis: an axis in the x-y plane where blades rotate forward on one side of the axis and backward on the other side. The axis is determined by connecting the two angles where there is a reversal in the direction of rotation. The wind shear axis is generally the x-axis.

Hub Axis: an axis in the x-y plane that is perpendicular to the wind shear axis and the rotor axis. The orientation of the rotor axis is changed by rotating around the hub axis. The hub axis is generally the y-axis.

As depicted in FIG. 1, a typical horizontal wind turbine generator comprises a vertical cylindrical tower 102, a horizontal cylindroidal nacelle 104 and a rotor 106. The rotor 106 comprises a rotor hub 108, from which extend two or more blades 110. The rotor hub 108 is axially connected to a main shaft 112, which transmissively connects through a gear box 114 to a generator 116 in the nacelle 104. The nacelle 104 is rotatably attached to the tower 102, such that the nacelle 104 and rotor 106 can be rotated about a yaw axis 118, which axially extends vertically through the tower 102. The rotation about the yaw axis 118 is used to keep the rotor 106 pointed into the wind, i.e., to keep the z-axis aligned with the wind direction 120. This yaw rotation is actuated by a yaw drive 122 and yaw motor 124 in the top of the tower 102, which in turn is controlled by a microprocessor controller 126 in the nacelle 104, based on readings from an anemometer 128 and a wind vane 130.

The typical wind turbine generator as shown if FIG. 1 is modified by replacing the rotor hub 108 with a ball-and-socket hub 200 as depicted in FIG. 2A. As shown in FIG. 2A, the ball-and-socket hub 200 of the present invention comprises a main shaft ball 202, a hub socket 204 and outer hub 205 that surrounds the main shaft 112. This change in the design of the hub applies to all embodiments of the present invention.

FIGS. 2B and 2C show a 20° back-and-forth rotation of a blade 110 during one rotation cycle around the main shaft 112 and the resulting 20° change in orientation of the rotor axis 222 for all embodiments of the present invention. FIG. 2B, which is a side view, shows blade 110 rotates around the z-axis and also rotates back-and-forth around the x-axis (perpendicular to plane of paper). Blade 110 is at the maximum forward position at 180° (110a). During clockwise rotation, blade 110 continues to rotate backward due to higher wind speed past the top of the rotation until it is at the maximum backward position at 0° 110e. The blade then rotates forward due to lower wind speed to the bottom of the rotation and continues to do so until reaching the 180° position 110a where the rotation cycle is completed.

Reversals in the direction of rotation occur at 180° 110a and 0° 110e, indicating that the x-axis is the wind shear axis 233. Since the wind shear axis 233 is the x-axis, the hub axis 235 is the y-axis, or the axis perpendicular to the wind shear axis 233 in the x-y plane. FIG. 2C, which is a top view of FIG. 2B, shows the wind shear axis 233. FIG. 2C shows the blade at the 180° position 110a and at the 135° position 110b have a forward rotation angle of 20°, as indicated by the angle formed by the wind shear axis 233 and the radial lines 231 drawn through the center of the blades 110. The blade at the 45° position 110d and at the 0° position 110e show a backward rotation angle of 20° with respect to the wind shear axis 233. FIG. 2C shows all blades align along this 20° rotation with respect to the wind shear axis 233. This alignment of all blades indicates that the plane of blade rotation is rotated 20° with respect to the x-y plane. The rotor axis 222 is at the center of blade rotation and perpendicular to the plane of blade rotation. FIG. 2C shows the orientation of the rotor axis 222 is rotated 20° around the hub axis 235 (FIG. 2B) with respect to the z-axis. In a typical horizontal wind turbine generator as depicted in FIG. 1, an equivalent change in orientation of the rotor axis would require a 20° rotation of the wind turbine around the yaw axis 118. In general, a back-and-forth rotation by the blades by a given angle leads to a rotation in orientation of the rotor axis 222 around the hub axis 235 by the same angle. In cases where the wind speed is greater at the bottom of the rotation than at the top, the angle is negative, so that back-and-forth rotation of the blades 110 and rotation of the rotor axis 222 around the hub axis 235 would be in the opposite direction.

The present invention is based on a transfer of rotation around the z-axis from the hub socket 204 to the main shaft ball 202 by multiple rotational transfer means, which can operate mechanically or magnetically. FIG. 3 illustrates the configuration the main shaft ball 202 and the main shaft 112. The main shaft 112 is inserted through the center of a main shaft ball 202. The main shaft ball 202 contains multiple round ball magnets 206 that fit into recesses in the main shaft ball 202. The round ball magnets 206 are uniformly equatorially distributed, which means that they are centered on and uniformly distributed around an equator of the main shaft ball 202 that is perpendicular to the z-axis, or main shaft axis. The round ball magnets 206 are magnetized such that the entire outer surface of each has a uniform magnetic strength and polarity, e.g., north. The center of the main shaft ball 202 defines the origin of the x-axis, y-axis and z-axis as shown in FIG. 2A.

FIG. 4 illustrates the preferred configuration of the hub socket 204 and outer hub 205. The hub socket 204 comprises an inner socket surface 208 and an outer socket surface 210. The inner socket surface 208 is a portion of the surface of a sphere having a slightly greater diameter than that of the main shaft ball 202 (FIG. 3), which it slidably surrounds. Embedded in the inner socket surface 208, are a series of longitudinal socket magnets 212, indicating that they have the same curvature and orientation as the longitudinal lines of earth. The longitudinal socket magnets 212 are spherical shell segments that conform to the contours of the inner socket surface 208. The longitudinal socket magnets 212 are uniformly equatorially distributed, which means that they are centered on and uniformly distributed around an equator of the main shaft ball 202 (FIG. 3) that is perpendicular to the rotor axis 222. The longitudinal socket magnets 212 are elongated in the direction of the rotor axis 222. The inner surface of each of the longitudinal socket magnets 212 has a uniform magnetic strength and polarity, which is opposite to the polarity of the outer surface of the corresponding round ball magnet 206 (FIG. 3), such that there is a strong magnetic attraction between the longitudinal socket magnets 212 and the round ball magnets 206 (FIG. 3). The longitudinal socket magnets 212 align over the round ball magnets 206 (FIG. 3) so as together to form a series of cooperating pairs of dynamic rotational couplers 214. The dynamic rotational couplers couple the hub socket 204 with the main shaft ball 202 (FIG. 3) during rotation of the rotor 106, while at the same time enabling back-and-forth rotation of the hub socket 204 with respect to the main shaft ball 202 (FIG. 3). The outer hub 205, which is positioned on the outer socket surface 210, is comprised of multiple annular cylindrical socket extensions 216, multiple pitch adjustment rings 218 that can be rotated to change the pitch of the blades 110 (FIG. 2A), and multiple blade connectors 220.

FIG. 5 shows a front view of the arrangement dynamic rotational couplers 214 and turbine blades 110 surrounding a main shaft 112 for a typical three bladed turbine, with remaining parts of the ball-and-socket hub are removed for clarity. FIG. 5 shows the alignment of three dynamic rotational couplers 214 with three blades 110. This alignment is indicated by radial lines 231 intersecting the center of the dynamic rotational couplers 214 and the blades 110. FIG. 5 also shows three other dynamic rotational couplers 214. FIG. 5 also shows the center of the main shaft 112 has a pitch control wire opening 246 that allows for passage of wires to control the pitch of the blades 110.

FIG. 6A shows a top view of the dynamic rotational couplers 214, turbine blades 110, and main shaft 112 described in FIG. 5. FIG. 6A shows that the blades 110 and dynamic rotational couplers 214 are all perpendicular to the main shaft 112. FIG. 6B shows a top view of the dynamic rotational couplers 214, turbine blades 110 and main shaft 112 after the hub socket 204 (FIG. 4) has been rotated around the y-axis by 20°. Comparison of FIG. 6B with FIG. 6A shows the only changes are that blade 110a and longitudinal socket magnet 212a rotate forward together as indicated by radial line 231a intersecting the center of each, and blade 110c and longitudinal socket magnet 212c rotate backward together as indicated by radial line 231c intersecting the center of each. The round ball magnets 206a and 206c do not rotate about the wind shear axis. FIGS. 6A and 6B demonstrate that the back-and-forth rotations of the blades 110 result in a corresponding back-and-forth rotation of the longitudinal socket magnets 212 across the round ball magnets 206. FIG. 6B also shows that the rotor axis 222 is no longer aligned with the main shaft 112, since the rotor axis 222 is now oblique to the main shaft axis (or z-axis) at an angle of 20°.

FIGS. 7A and 7B are isometric drawings that show the movement of a longitudinal socket magnet 212 across a round ball magnet 206 during one rotation cycle. FIGS. 7A and 7B show the longitudinal socket magnet 212 does not move across the round ball magnet 206 for positions at the y-axis, which indicates that the hub axis is aligned with the y-axis. FIGS. 7A and 7B show maximum forward and backward rotation of the longitudinal socket magnet 212 for positions along the x-axis, indicating that the wind shear axis is the x-axis. The back-and-forth rotations depicted in FIG. 7A lead to a 10° rotation of the hub socket 204 (FIG. 4) around the y-axis, which is the hub axis. As the vertical gradient in wind speed increases, the back-and-forth rotations of the hub socket 204 (FIG. 4) also increase. This increase is shown in FIG. 7B where the back-and-forth rotations lead to a 20° rotation of the hub socket 204 (FIG. 4) around the y-axis (hub axis). The rotations are best observed at the intersection of the x-axis with the longitudinal socket magnet 212. Examination of one rotation cycle for the movements of the longitudinal socket magnets 212 in FIGS. 7A and 7B shows a rotation around the x-axis in addition to the rotation around the z-axis. FIGS. 7A and 7B demonstrate that back-and-forth rotation around the x-axis (wind shear axis) causes a rotation of the hub socket 204 (FIG. 4) around the y-axis (hub axis) and that the extent of rotation around the y-axis is determined by the extent of back-and-forth rotation of the blades. Although FIGS. 5, 6A, 6B and 7A are depicted with dynamic rotational couplers 214 comprised of longitudinal socket magnets 212 and round ball magnets 206, any dynamic rotational couplers 214, including mechanical couplers, could be substituted in the drawings. Dynamic rotational couplers 214 based upon magnetic rotational coupling, however have the advantage of avoiding frictional forces inherent in mechanical coupling, thereby reducing wear-and-tear on the mechanism.

Another approach to the design of dynamic rotational couplers 214 is depicted in FIGS. 8 and 9. In this exemplary configuration, the rotational transfer means operate by mechanical coupling. FIG. 8 illustrates the preferred configuration of the main shaft ball 202 and the main shaft 112. This configuration is identical to that of the magnetic version depicted in FIG. 3, except that the round ball magnets 206 have been replaced by coupling rods 224 in the outer surface of the main shaft ball 202. The coupling rods 224 are uniformly equatorially distributed in relation to the z-axis. FIG. 9 depicts the preferred configuration of the hub socket 204, which is identical to that of the magnetic version shown in FIG. 4, except that the longitudinal socket magnets 212 have been replaced by longitudinal socket grooves 226, and the number of blades has been decreased from three to two. The longitudinal socket grooves 226 are uniformly equatorially distributed in relation to the z-axis. The coupling rods 224 (FIG. 8) fit within the longitudinal socket grooves 226 in hub socket 204. The longitudinal socket grooves 226 and the coupling rods 224 (FIG. 8) cooperate to function as mechanical rotational transfer means—transmitting the rotational motion from the hub socket 204 to the main shaft ball 202—in the same way that the longitudinal socket magnets 212 and the round ball magnets 206 cooperate to function as magnetic rotational transfer means. Together a coupling rod 224 (FIG. 8) and a longitudinal socket groove 226 comprise a dynamic rotational coupler 214.

The most significant advantage of the ball-and-socket hub is that the rotor axis is continuously maintained at an optimal hub angle by wind forces without changing the orientation of the main shaft axis. Because effective wind speeds on the blades are largely balanced at the optimal hub angle, there will be less cyclic stress placed on the blades and other moving parts of the wind turbine. Also, for a conventional wind turbine, realignment of the rotor axis requires rotation about the yaw axis and considerable torque is needed to overcome the gyroscopic forces that resist changes to the rotor axis. When a rotation about the yaw axis is necessary in the present invention, the rotor axis is already oriented at the optimal angle, and the yaw drive merely rotates the nacelle to align the main shaft axis with the rotor axis. Furthermore, by enabling more rapid response to shifts in wind direction, the y-axis rotation of the present invention's rotor axis enhances the efficiency of the wind turbine by reducing power output losses associated with non-optimal yaw angle.

Other advantages of the present invention have been shown by computer modeling. A ball-and-socket hub on a three-bladed turbine is predicted to significantly reduce stress forces applied to the blades, shaft, yaw bearing, and tower when compared to a three-bladed turbine with a fixed hub. Additionally, a ball-and-socket hub on a three-bladed turbine is predicted to significantly reduce stress forces applied to the blades and tower when compared to a teetering two-bladed turbine. This reduction in stress forces will reduce both cost of manufacture and/or lifecycle time of the wind turbine.

Two additional advantages enabled by the present invention apply specifically to ball-and-socket hubs with magnetic coupling. Firstly, by having a small gap between the ball and socket magnets, magnetic coupling allows for back-and-forth movement of the socket magnets over the ball magnets while transferring significant torque without any physical contact between the magnets. Secondly, the strength of the magnetic coupling can be set to a value that limits the amount of torque that can be transferred from the socket to the ball. When the torque exceeds this limit, the coupling between each magnet pair breaks and the ball and socket magnets form new pairs. This allows the turbine blades to spin faster than the main shaft in cases where there are sudden strong gusts of wind that could possibly damage the generator. If the blades do rotate faster than the shaft, it would be absolutely necessary to rapidly apply wind brakes in order to slow rotation and avoid damage to the blades.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 5 is a front detail view of the dynamic rotational couplers and turbine blades surrounding the main shaft of the present invention based on magnetic rotational coupling;

FIG. 6A is a top detail view of FIG. 5 showing the dynamic rotational couplers and turbine blades surrounding the main shaft of the present invention based upon magnetic rotation coupling;

FIG. 6B is a top detail view of the dynamic rotational couplers and turbine blades surrounding the main shaft of the present invention based upon magnetic rotation coupling; depicting the movement of the blades and longitudinal socket magnets relative to round ball magnets;

FIG. 7A is a detailed isometric view of a 10° rotation around the y-axis caused by movement of longitudinal socket magnets across round ball magnets during one rotation cycle of the present invention;

FIG. 7B is a detailed isometric view of a 20° rotation around the y-axis caused by movement of longitudinal socket magnets across round ball magnets during one rotation cycle of the present invention;

FIG. 8 is a side detail view of the main shaft ball and main shaft of an exemplary embodiment of the present invention based on mechanical rotational coupling;

FIG. 19 is a side view of the rotor, the nacelle and the tower;

DETAILED DESCRIPTION OF THE PREFERRED EMBODIMENTS

Figure 1:
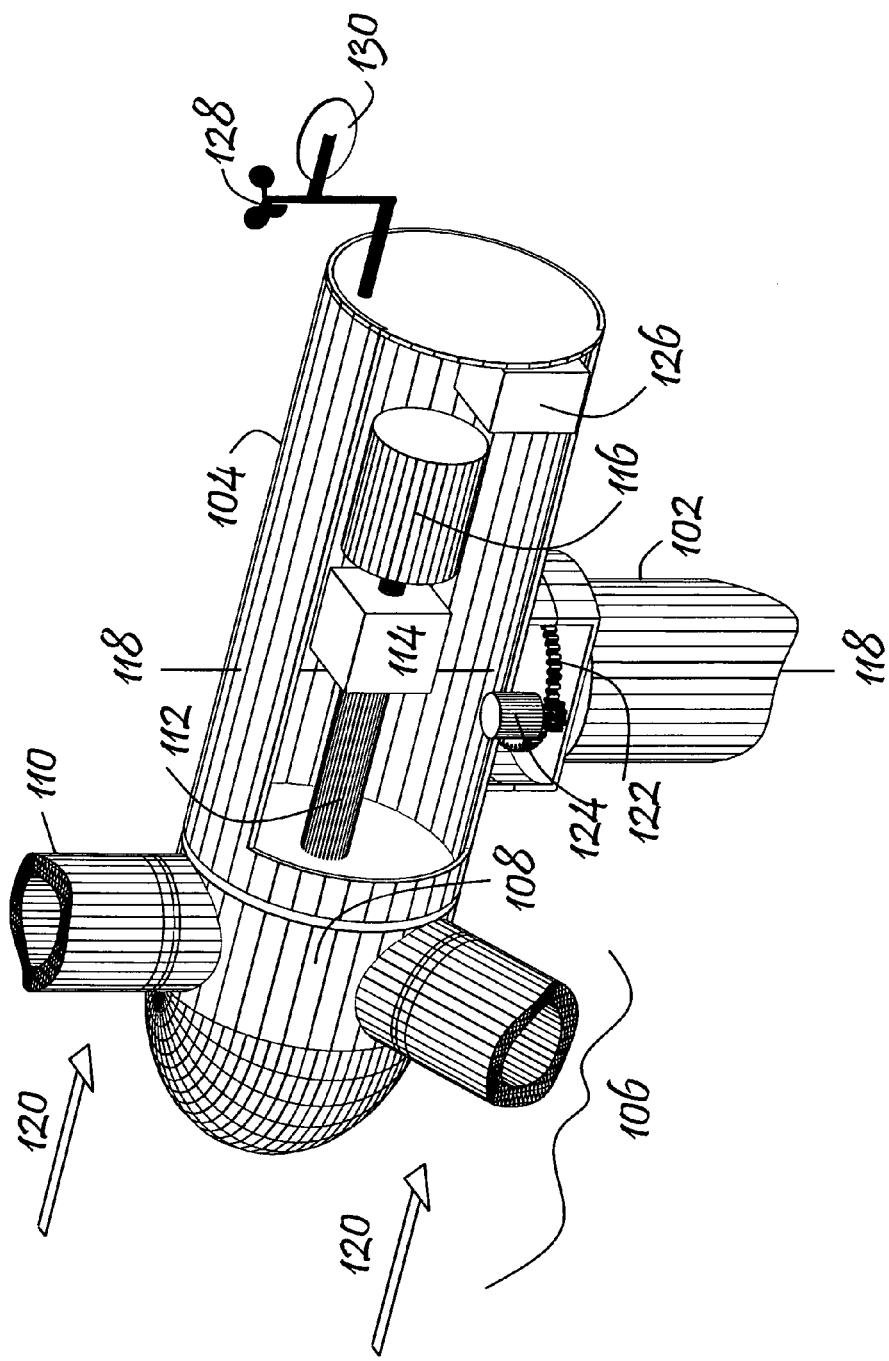
FIG. 1 is a perspective view of a typical horizontal-axis wind turbine generator, depicting the principal components thereof.
Figure 2A:
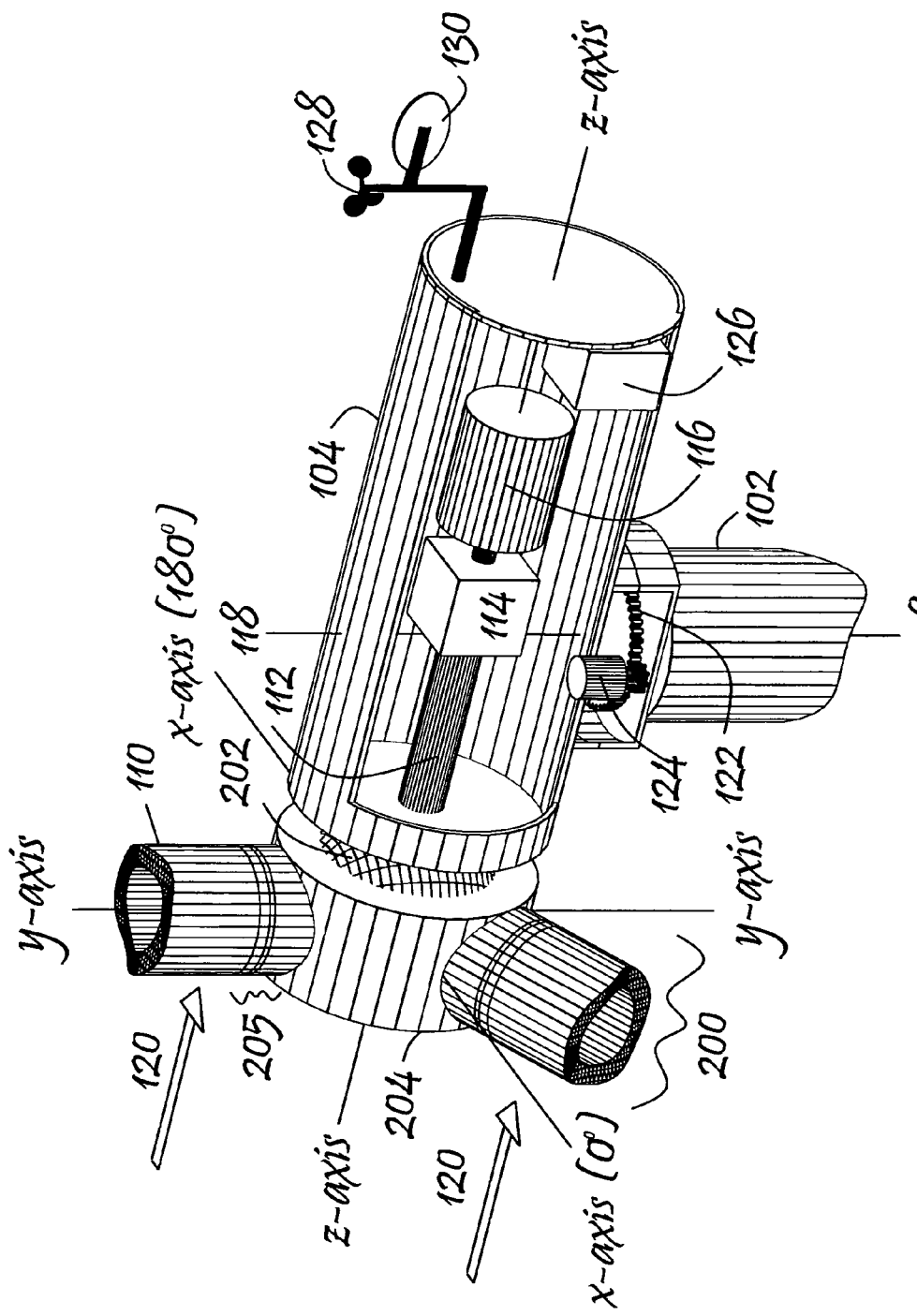
FIG. 2A is a perspective view of a horizontal-axis wind turbine generator, where a ball-and-socket hub has replaced the rotor hub, as well as orientations of the x, y and z axes.
Figure 2C:
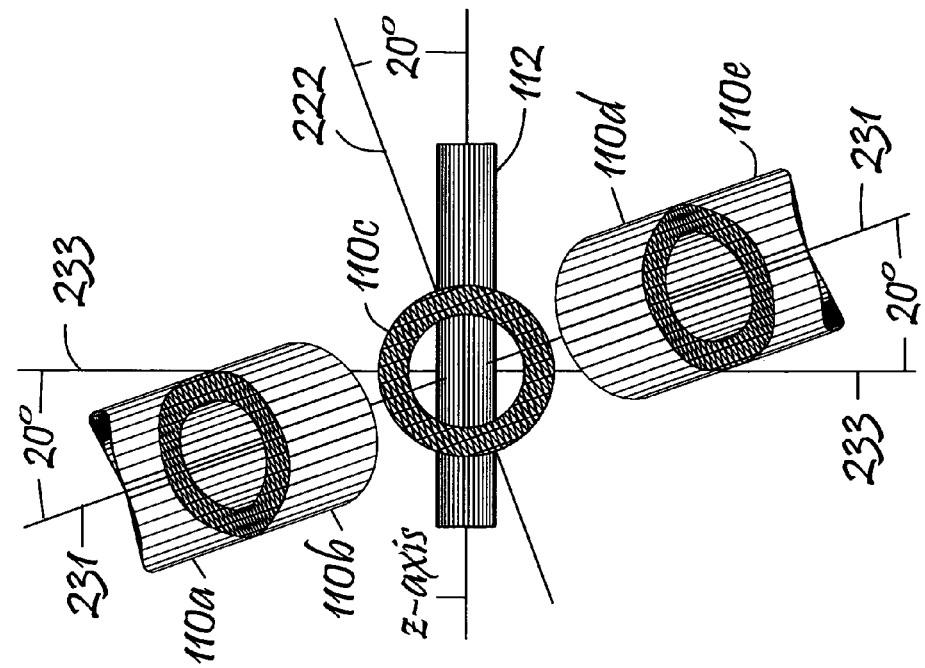
FIG. 2C is a top view of FIG. 2B showing the alignment of all blades and the 20° rotation of the rotor axis with respect to the wind shear axis.
Figure 2B:
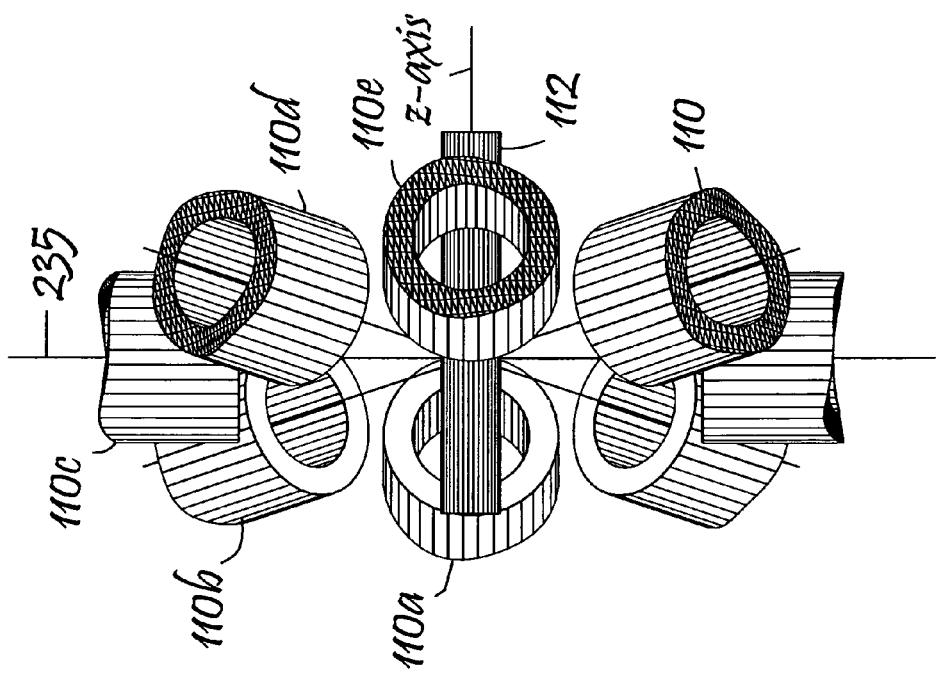
FIG. 2B is a side view of eight positions of a single blade during one rotation cycle around the main shaft after the blade has been rotated 20° around the y-axis.
Figure 3:
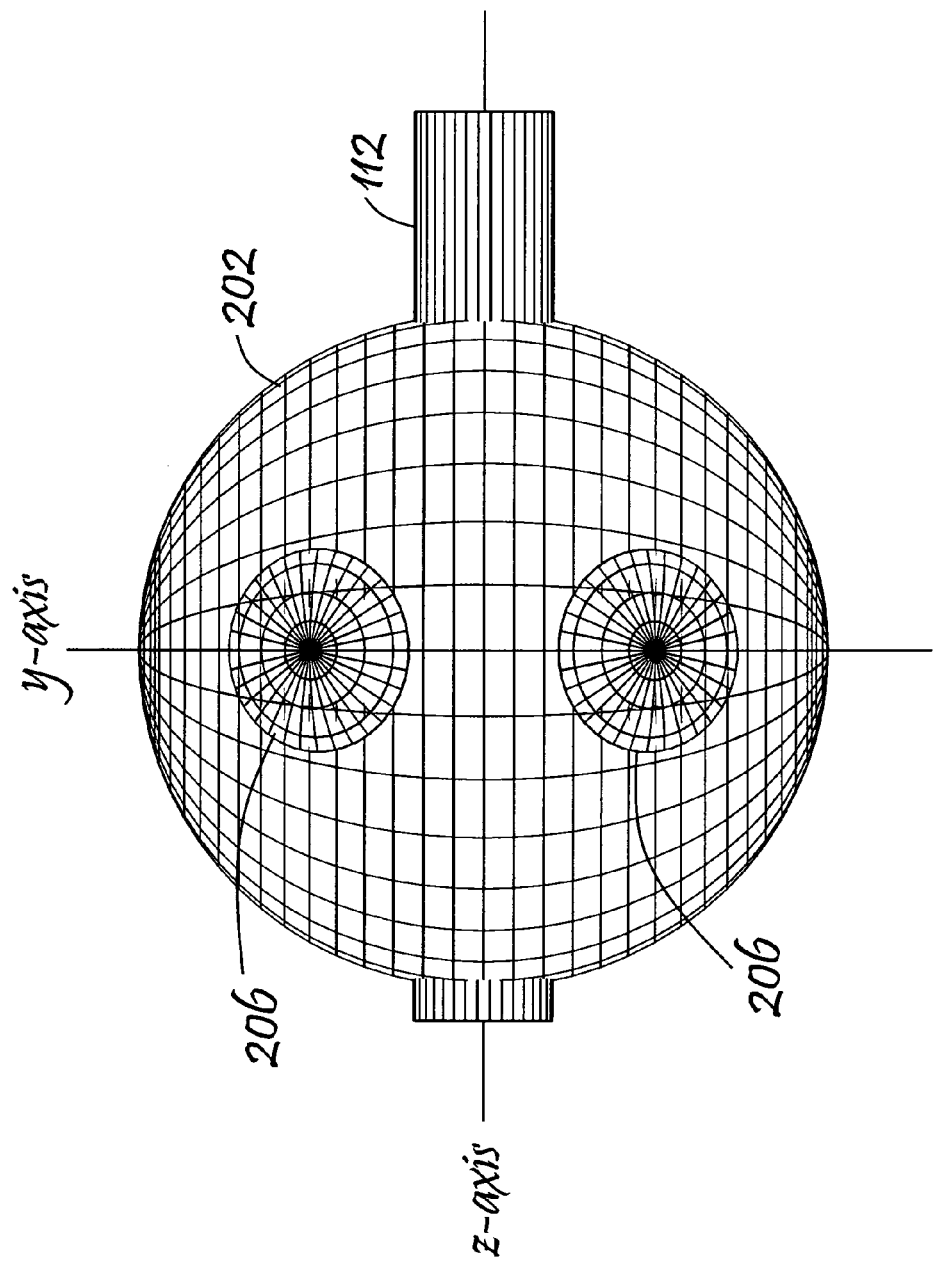
FIG. 3 is a side detail view of the main ball shaft and main shaft of the present invention based on magnetic rotational coupling.
Figure 4:
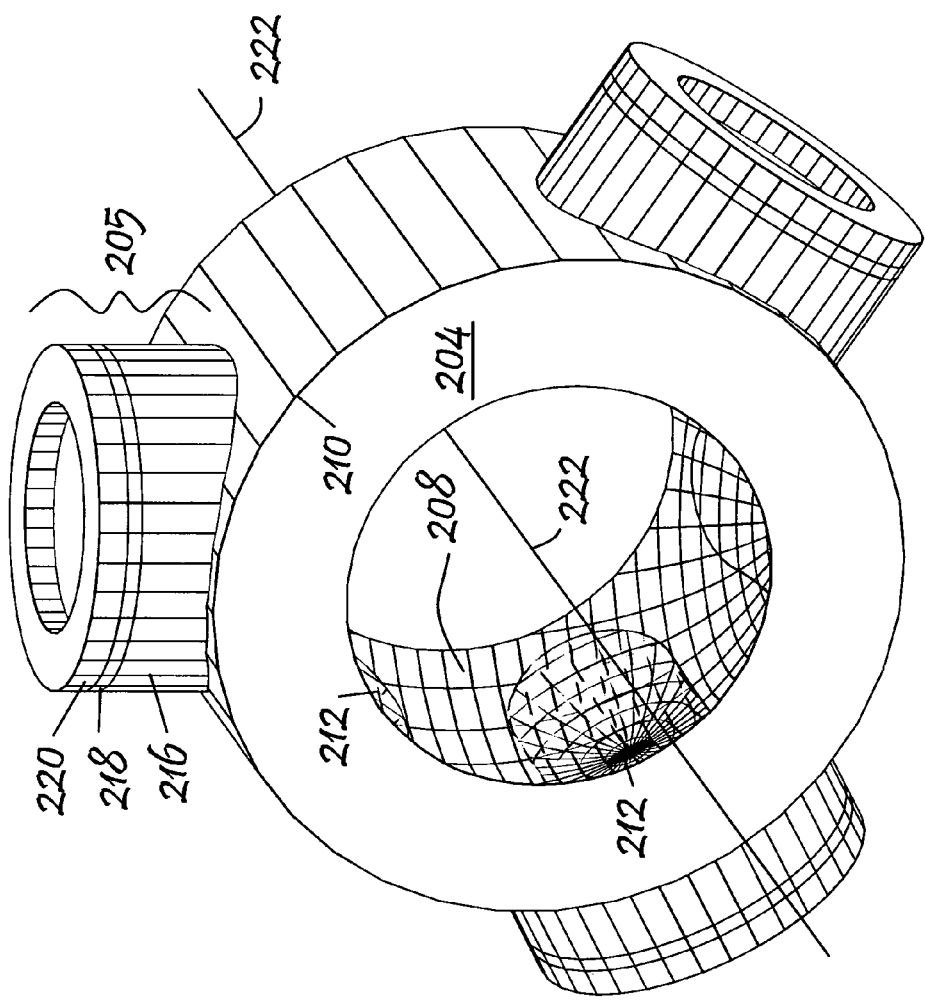
FIG. 4 is a detail view of a portion of the inner socket sphere of the present invention based on magnetic rotational coupling.
Figure 9:
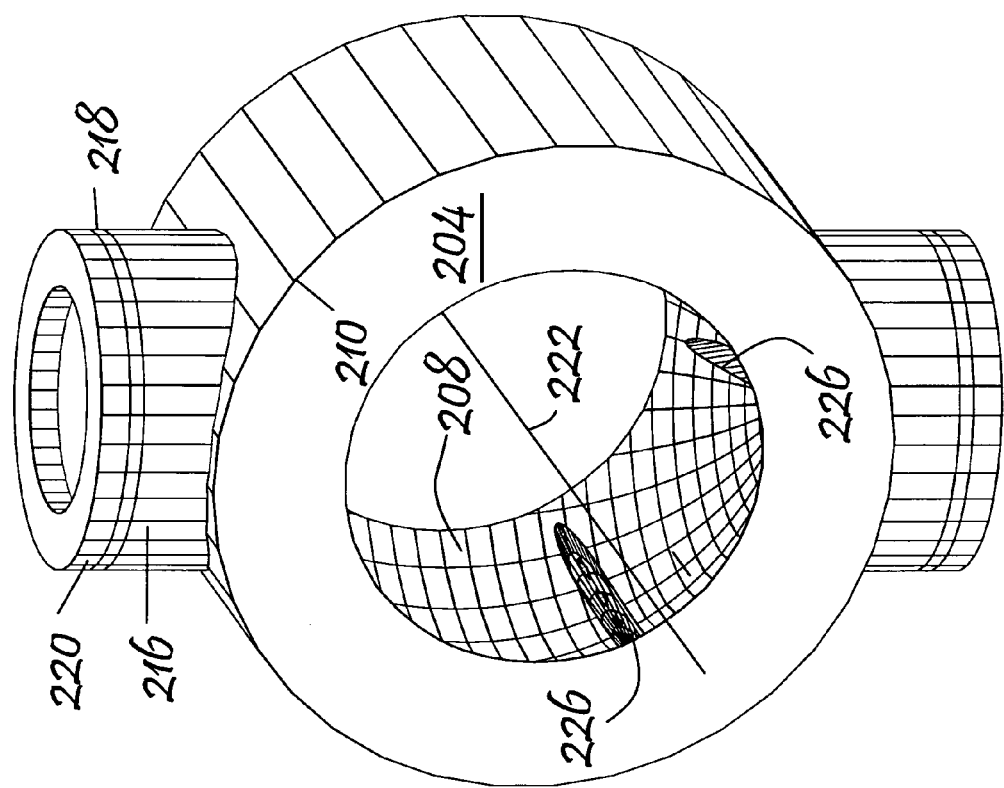
FIG. 9 is a detail view of a portion of the inner socket sphere of an exemplary embodiment of the present invention based on mechanical rotational coupling.
Figure 10:
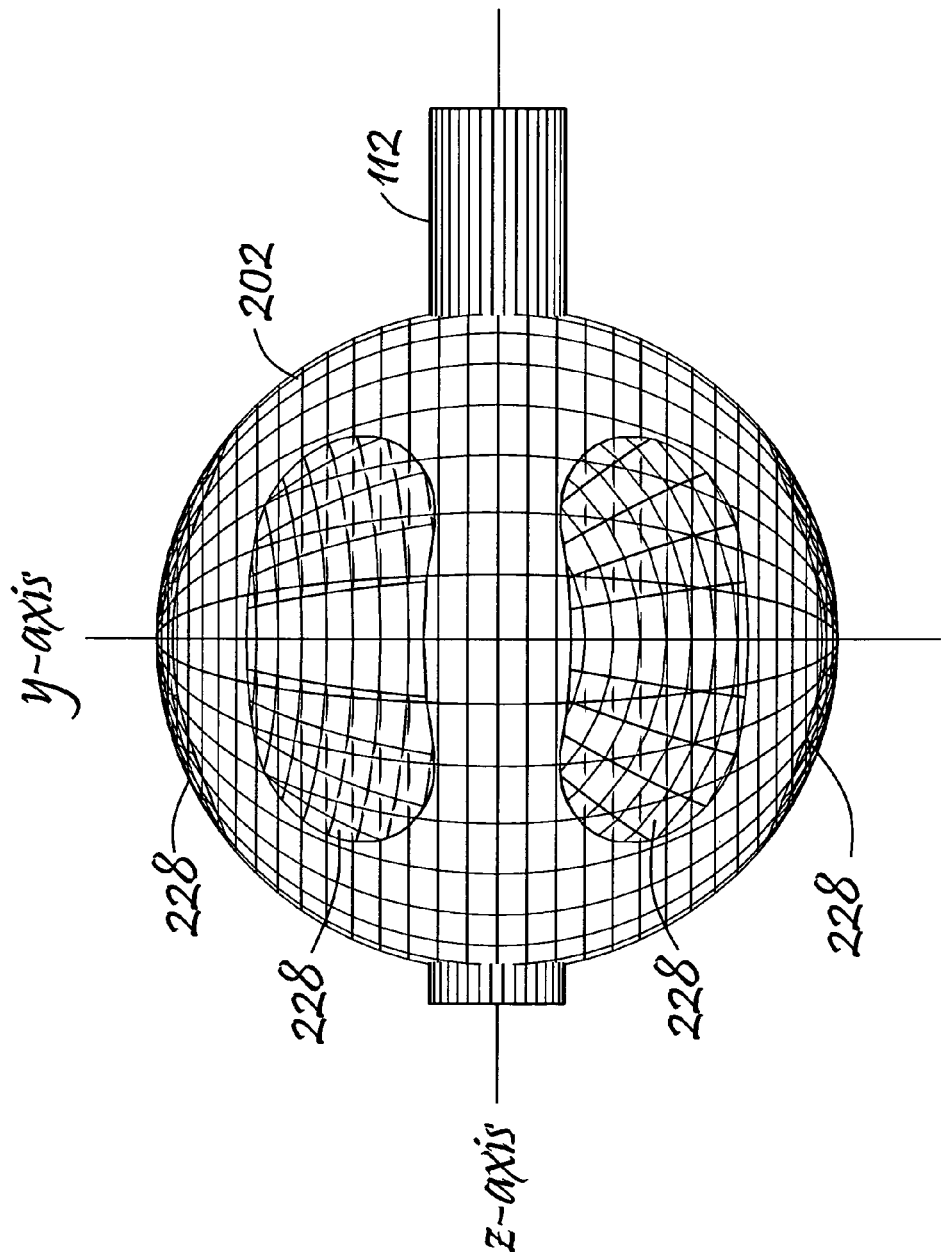
FIG. 10 is a side detail view of the main shaft ball and the main shaft of the first preferred embodiment of the present invention based upon magnetic rotational coupling.
Figure 11:
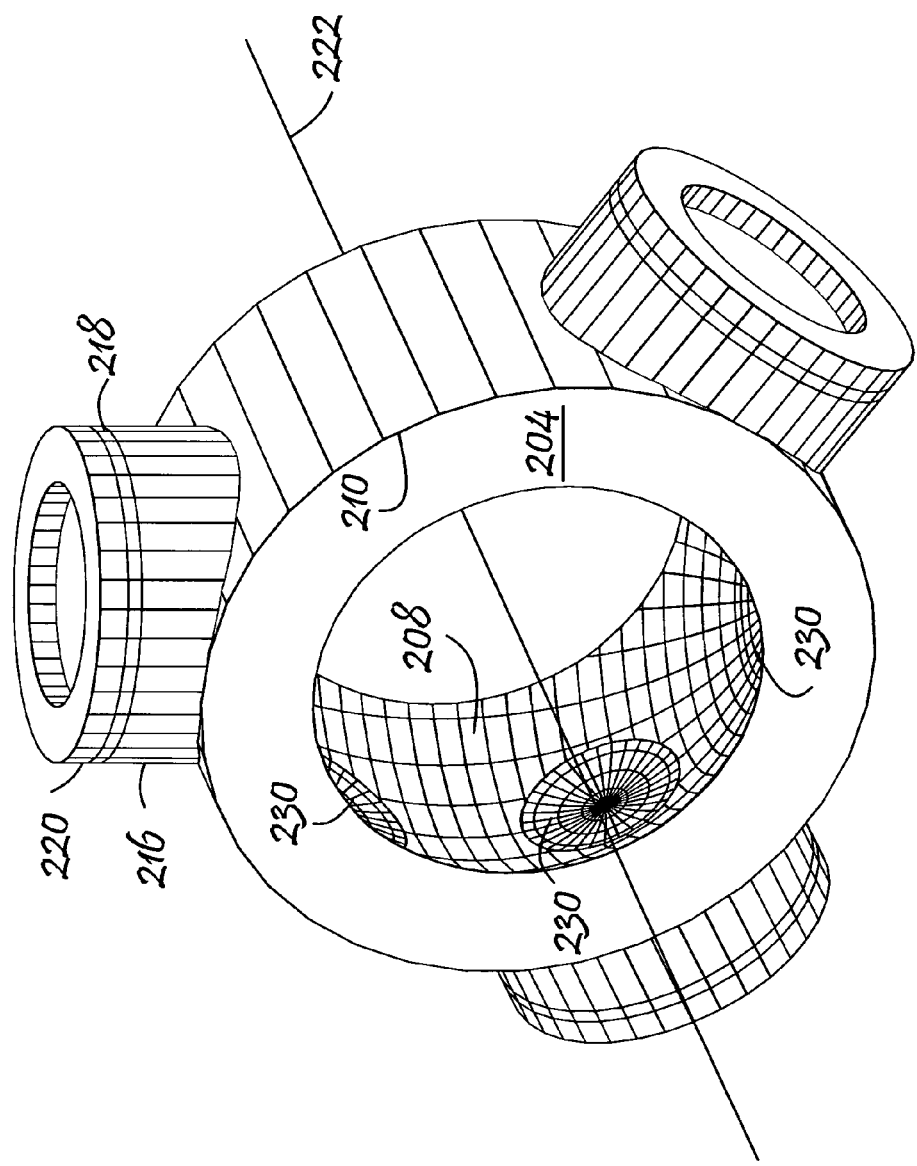
FIG. 11 is a cutaway perspective detail view of the hub socket of the first preferred embodiment of the present invention based upon magnetic rotational coupling.

The first preferred embodiment of the present invention is based on magnetic rotational coupling between the main shaft ball 202 and the hub socket 204. FIG. 10 illustrates the preferred configuration the main shaft ball 202 and the main shaft 112. The main shaft 112 is inserted through the center of a main shaft ball 202. The main shaft ball 202 contains multiple longitudinal ball magnets 228 that snuggly fit into recesses in the main shaft ball 202. The longitudinal ball magnets 228 are oblong spherical shell segments conforming to the contours of the surface of the main shaft ball 202 and uniformly equatorially distributed in relation to the z-axis. The longitudinal ball magnets 228 are magnetized such that the entire outer surface of each has a uniform magnetic strength and polarity, e.g., north. The longitudinal ball magnets 228 are elongated in the direction of the z-axis. FIG. 11 illustrates the preferred configuration of the hub socket 204, comprising an inner socket surface 208 and an outer socket surface 210. The inner socket surface 208 is a portion of the surface of a sphere having a slightly greater diameter than that of the main shaft ball 202, which it slidably surrounds. Multiple round socket magnets 230 are embedded in the inner socket surface 208. The round socket magnets 230 are round spherical shell segments that conform to the contours of the inner socket surface 208. The round socket magnets 230 are uniformly equatorially distributed, which means that they are centered on and uniformly distributed around an equator of the inner socket surface 208 that is perpendicular to the rotor axis 222. The outer surface of each of the round socket magnets 230 has a uniform magnetic strength and polarity, which is opposite to the polarity of the outer surface of the corresponding ball magnet 228 (FIG. 10), such that there is a strong magnetic attraction between the round socket magnets 230 and the longitudinal ball magnets 228 (FIG. 4). This magnetic attraction causes the round socket magnets 230 to align over the longitudinal ball magnets 228 (FIG. 4) and form a magnetic rotational coupling. Together, a round socket magnet 230 and a longitudinal ball magnet 228 (FIG. 4) comprise a dynamic rotational coupler. On the outer socket surface 210 are multiple annular cylindrical socket extensions 216 that are used for mounting the rotor blades 110 (FIG. 2A). At the distal end of each socket is a pitch adjustment ring 218 that can be rotated to change the pitch of the blades 110 (FIG. 2A). The distal sides of the pitch adjustment rings 218 are, in turn, connected to the blade connectors 220.

Figure 12:
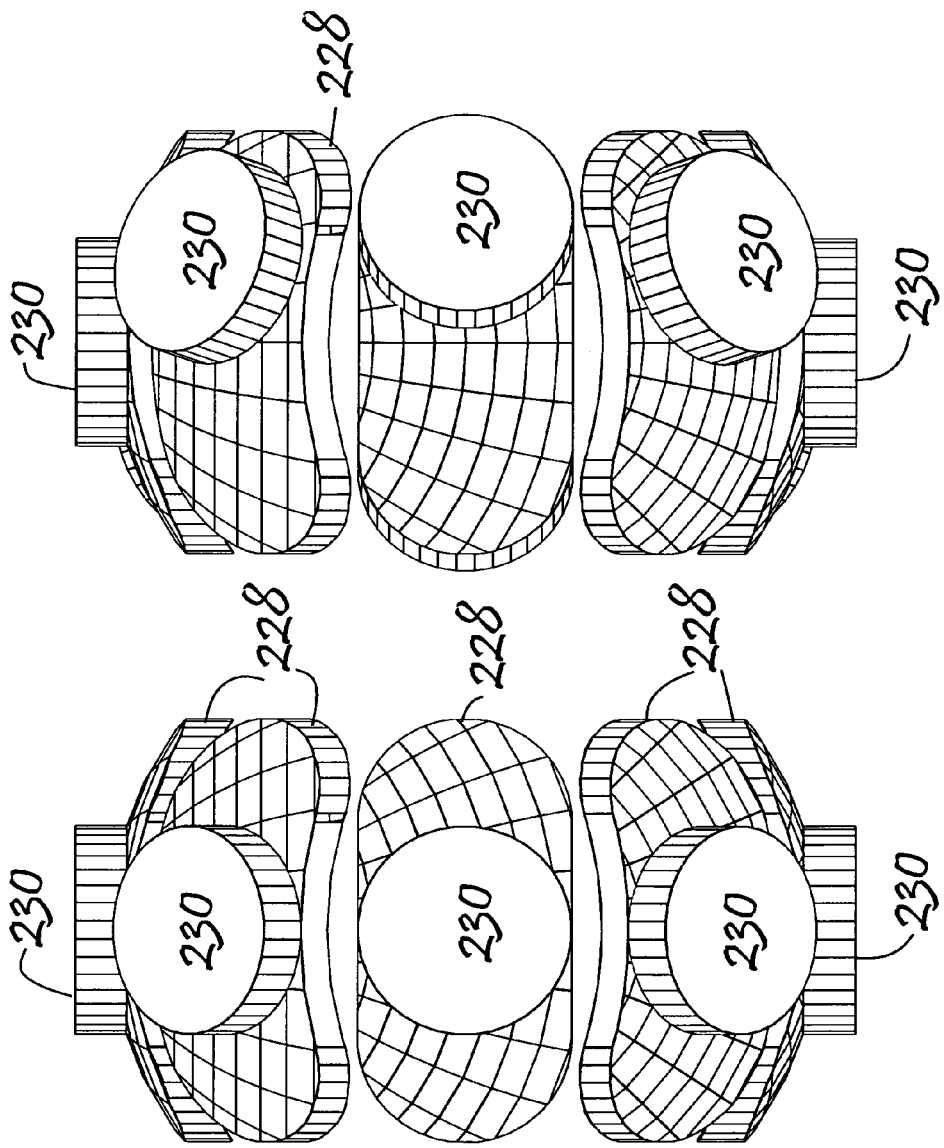
FIG. 12A is a detail side view of the round socket magnets and the longitudinal ball magnets, with the main shaft ball and hub socket removed for clarity, of the first preferred embodiment of the present invention.
FIG. 12B is a detail side view of round socket magnets and the longitudinal ball magnets of FIG. 12A, where the socket magnets have been rotated 20° about the y-axis.

FIGS. 12A and 12B are side views of a dynamic rotational coupler 214 showing the movement of a round socket magnet 230 across a longitudinal ball magnet 228 during one-half of a rotation cycle. FIG. 12A depicts the relative alignment of the round socket magnets 230 with the longitudinal ball magnets 228 when the axis of rotation of the hub socket 204 is aligned with the z-axis. Since the hub socket 204 and the rotor 106 move together, the axis of rotation of the hub socket 204 is identical to the rotor axis 222. In this "90°" alignment, the round socket magnet 230 is positioned at the center of the longitudinal ball magnet 228 in all views of the dynamic rotational coupler 214. FIG. 12B shows a side view of the positions of a dynamic rotational coupler 214 where the round socket magnets 230 are at various locations along the longitudinal ball magnets 228. For example, a round socket magnet 230 at the 90° position is in the center of its corresponding ball magnet 228, while at the 0° position the round socket magnet 230 is at one end of the ball magnet 228. This movement of the round socket magnets 230 over the longitudinal ball magnets 228 is in response to the back-and-forth rotations of the blades 110.

A ±20° rotation of the hub socket 204 around the hub axis is the preferred design limit for the apparatus. This allowable rotation determines the length of the longitudinal ball magnets 228. For example, in FIG. 12B a round socket magnet 230 at the 180° position (with respect to the x-axis) is at one end of the longitudinal ball magnet 228, while at the 0° position the round socket magnet 230 is at the other end of the longitudinal ball magnet 228. The maximum rotation positions of the round socket magnet 230 at 180° and 0° indicate that the wind shear axis is the x-axis. As a consequence of these maximum rotation positions, the length of the longitudinal ball magnets 228 determines the allowable movement of the hub socket 204 with respect to the main shaft ball 202. A smaller range of back-and-forth movement of the blades 110 will result in a correspondingly smaller range of back-and-forth movement of the round socket magnets 230 and less rotation of the hub socket 204 around the hub axis.

The magnetic attraction between each pair of socket and longitudinal ball magnets 230 228 provides the magnetic coupling that prevents the hub socket 204 from freely rotating around the z-axis. The overall magnetic attraction, however, remains constant as long as the round socket magnet 230 is positioned anywhere along the elongated longitudinal ball magnet 228. This enables unconstrained back-and-forth movement of the round socket magnets 230 and the hub socket 204 with respect to the longitudinal ball magnets 228 and the main shaft ball 202, as long as the round socket magnet 230 does go past the end of the longitudinal ball magnet 228. Preferably, there should be a small gap between the round socket magnets 230 and the longitudinal ball magnets 228 to minimize friction.

Figure 13:
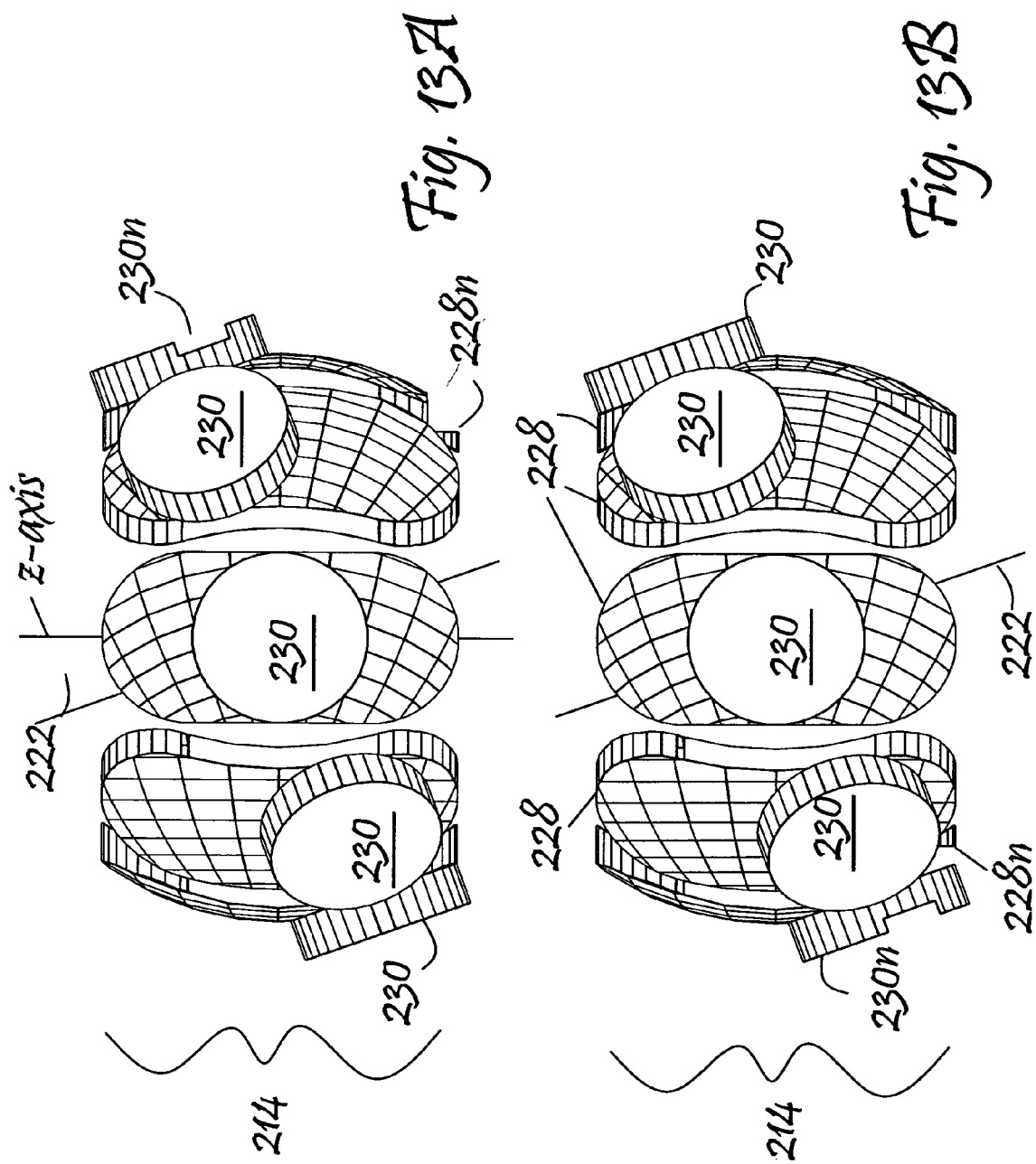
FIG. 13A is a detail top view of round socket magnets and the longitudinal ball magnets, where the round socket magnets have been rotated 20° about the y-axis of the first preferred embodiment of the present invention.
FIG. 13B is a detail top view of round socket magnets and the longitudinal ball magnets where the round socket magnets are first rotated 20° around the y-axis as in FIG. 13A, and then the longitudinal ball magnets were rotated 180° around the z-axis and the round socket magnets rotated 180° around the rotor axis.

FIGS. 13A and 13B are top views of a dynamic rotational coupler 214 showing the movement of a round socket magnet 230 across a longitudinal ball magnet 228 during one-half of a rotation cycle. In both figures, there is a 20° rotation of the hub socket 204 around the hub axis. FIG. 13A shows movement of the round socket magnet 230 with respect to the longitudinal ball magnet 228 with FIG. 12B, with maximum forward movement at 180° and maximum backward movement at 0°, indicating that the wind shear axis is the x-axis. FIGS. 13A and 13B also demonstrate that the longitudinal ball magnet 228 and round socket magnet 230 maintain integrity after rotating the two around different axes. In FIG. 13A, a notch was placed in a longitudinal ball magnet 228n and a round socket magnet 230n for marking purposes. Then a CAD program used to rotate all longitudinal ball magnets 228 around the z-axis by 180°, and rotate all round socket magnets 230 around the rotor axis 222 by 180°. In this example, the orientations of the z-axis and rotor axis 222 differ by 20°. FIG. 13B shows that after rotation around different axes, all dynamic rotational couplers 214 maintain integrity. FIG. 13B shows that in this 180° rotation, the round socket magnet 230n slides across the entire length of the longitudinal ball magnet 230n.

Figure 14:
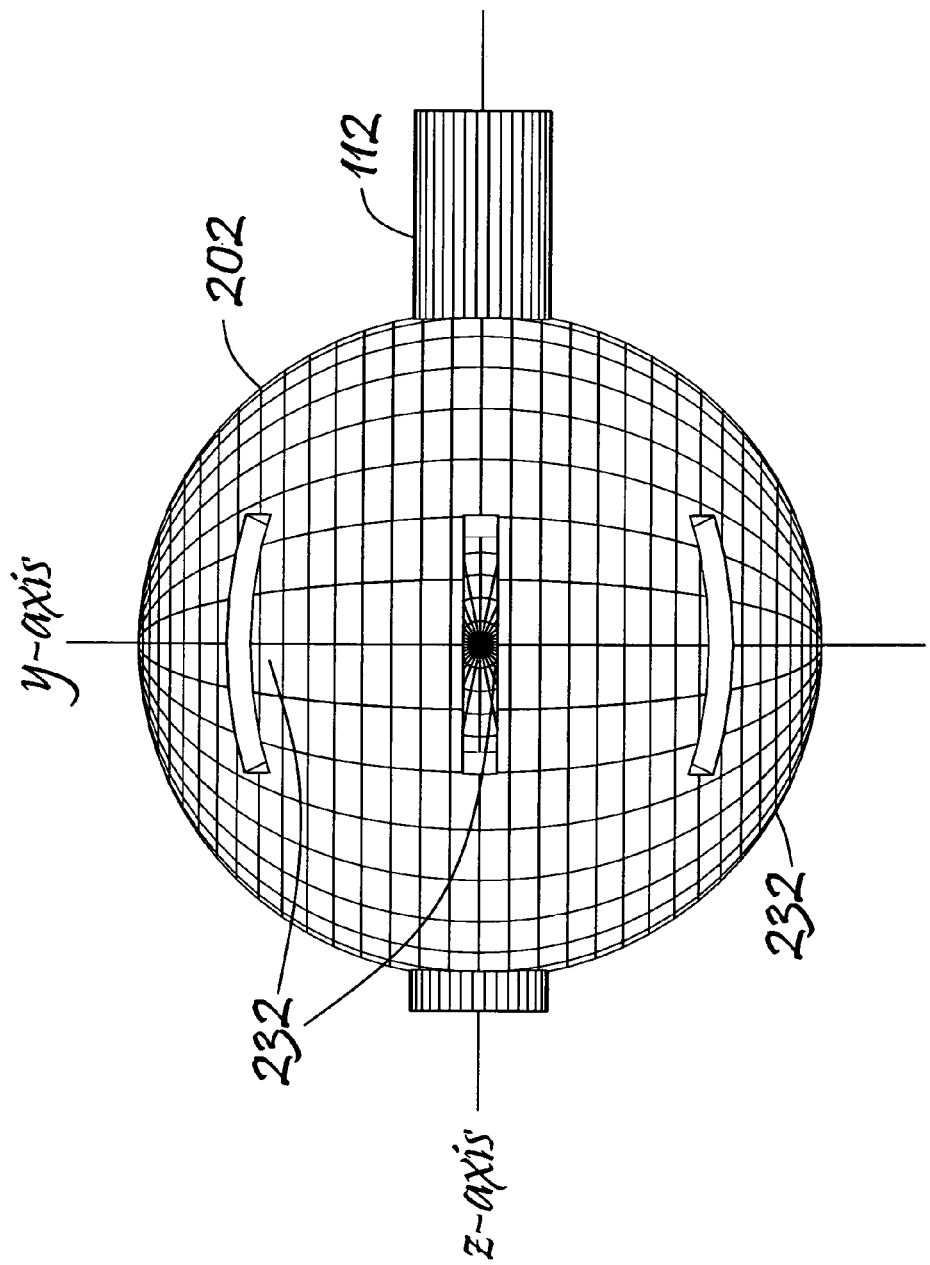
FIG. 14 is a side detail view of the main shaft ball and the main shaft of the second preferred embodiment of the present invention.
Figure 15:
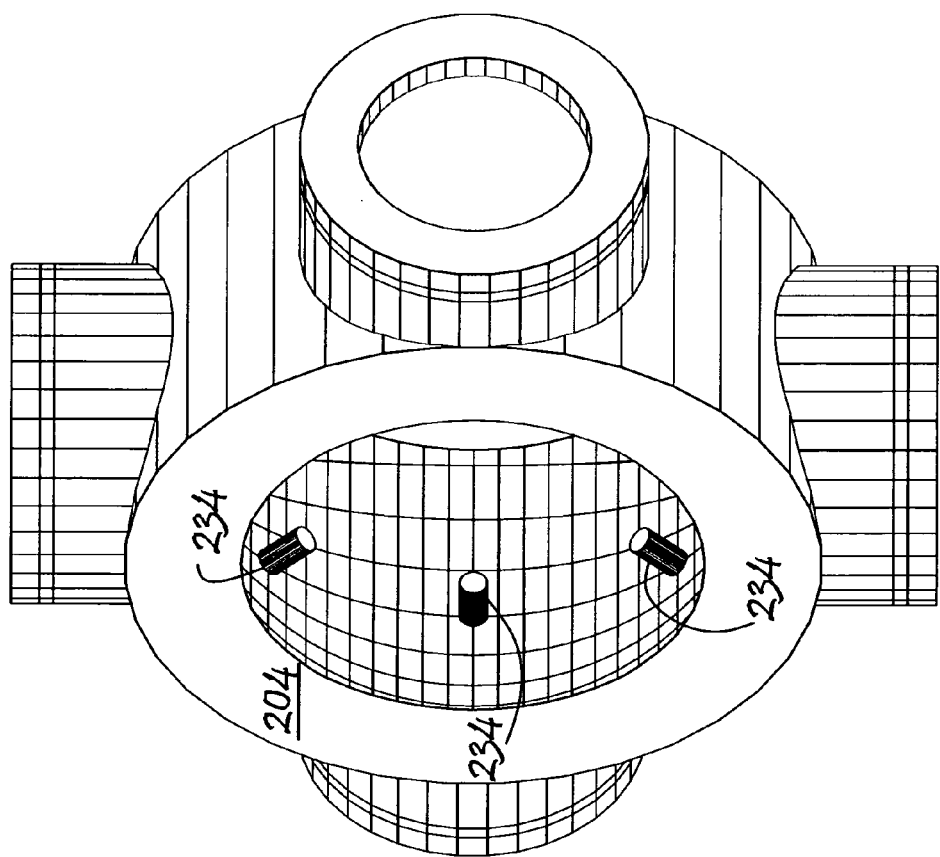
FIG. 15 is a cutaway perspective detail view of the hub socket of the second preferred embodiment of the present invention.

The second preferred embodiment of the present invention is based on mechanical rotational coupling between the main shaft ball 202 and the hub socket 204. FIG. 14 illustrates the preferred configuration the main shaft ball 202 and the main shaft 112. This configuration is identical to that of the magnetic version depicted in FIG. 10, except that the longitudinal ball magnets 228 have been replaced by multiple longitudinal ball grooves 232 in the outer surface of the main shaft ball 202 and the number of longitudinal ball grooves has been increased from six to eight. The longitudinal ball grooves 232 are uniformly equatorially distributed in relation to the z-axis. FIG. 15 depicts the preferred configuration of the hub socket 204, which is similar to that of the magnetic version shown in FIG. 11, except that the round socket magnets 230 have been replaced by coupling rods 234 and the number of blades has been increased from three to four. Together a longitudinal ball groove 232 and a coupling rod 234 comprise a dynamic rotational coupler. The coupling rods 234 are uniformly equatorially distributed in relation to the rotor axis 222, and they fit within the longitudinal ball grooves 232 (FIG. 14) of the main shaft ball 202 (FIG. 14). The longitudinal ball grooves 232 (FIG. 14) and the coupling rods 234 cooperate to function as mechanical rotational transfer means—transmitting the rotational motion from the hub socket 204 to the main shaft ball 202 (FIG. 14)—in the same way that the longitudinal ball magnets 228 and the round socket magnets 230 cooperate to function as magnetic rotational transfer means.

Figure 16:
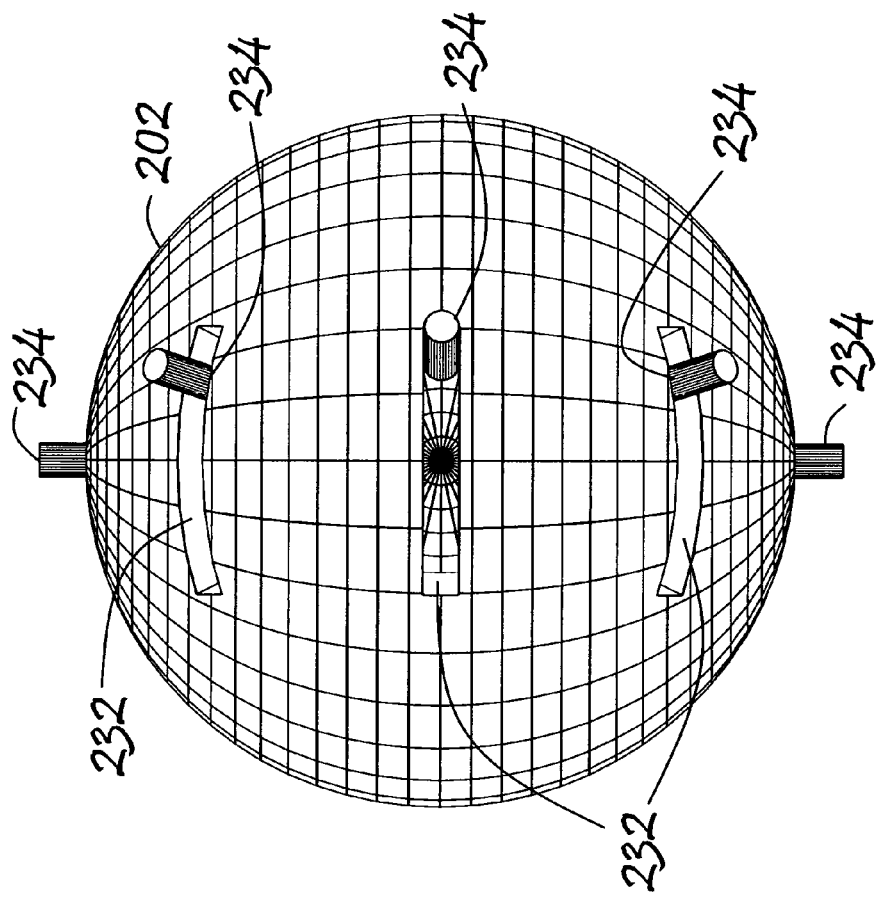
FIG. 16 is a detail side view of the main shaft ball of the second preferred embodiment of the present invention, where the coupling rods have been rotated 20° about the y-axis.

In the mechanical embodiment, freedom of the hub socket 204 to have an axis of rotation that differs from the axis of rotation of the main shaft is accomplished in a similar manner to that of the magnetic embodiment. FIG. 16 shows a side view of the coupling rods 234 of the hub socket 204 positioned within the longitudinal ball grooves 232 of the main shaft ball 202. In this view, the coupling rods 234 have been rotated 20° about the y-axis. This is the mechanical equivalent of the magnetic rotation depicted in FIG. 12B. Optionally, either the mechanical or the magnetic coupling embodiment can include one or more pitch control wires to control the pitch of the rotor blades 110 (FIG. 2A).

Figure 17:
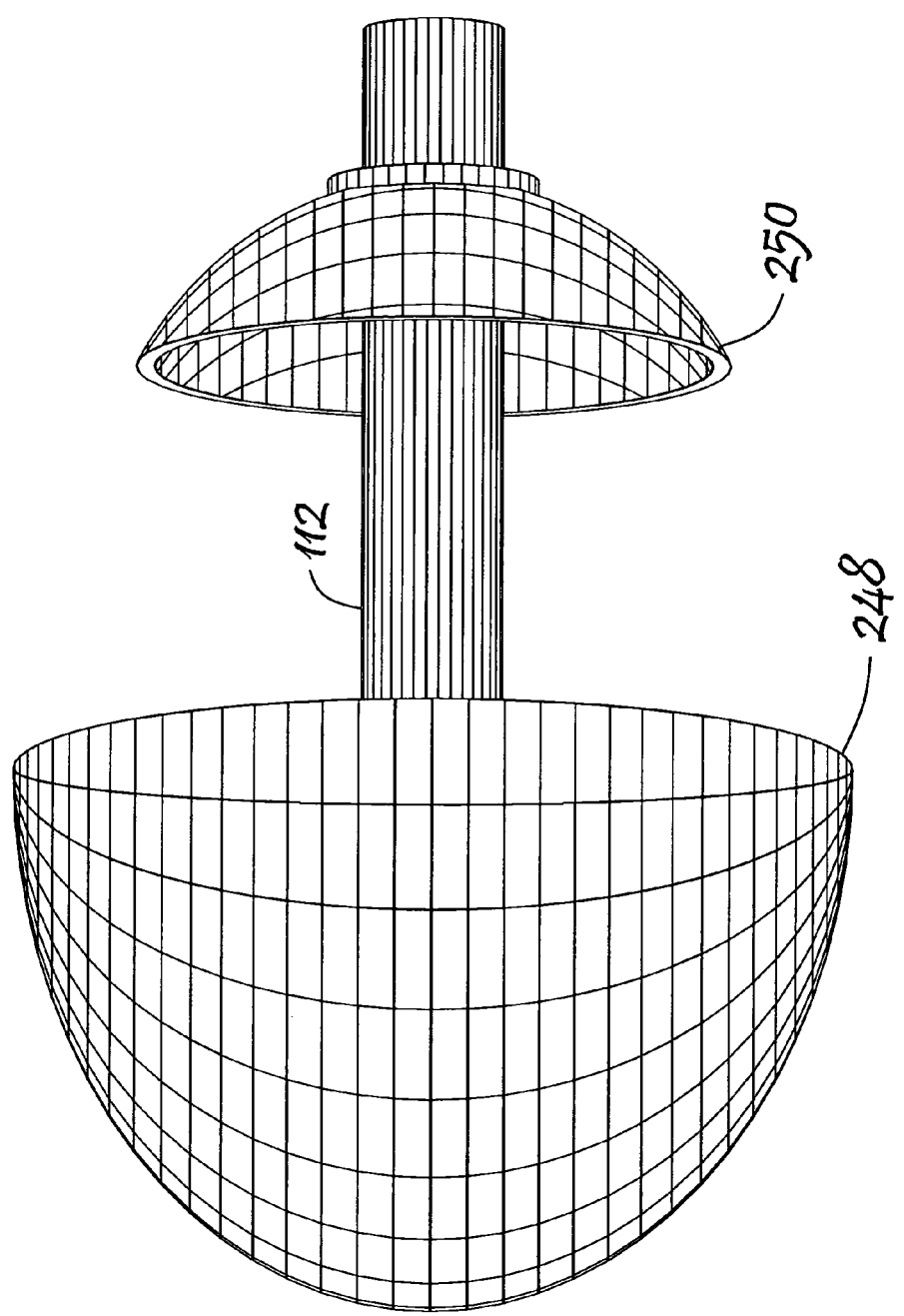
FIG. 17 is a side view of the optional nose cone and the inner hub protector with the hub removed for clarity.
Figures 20A, 20B:
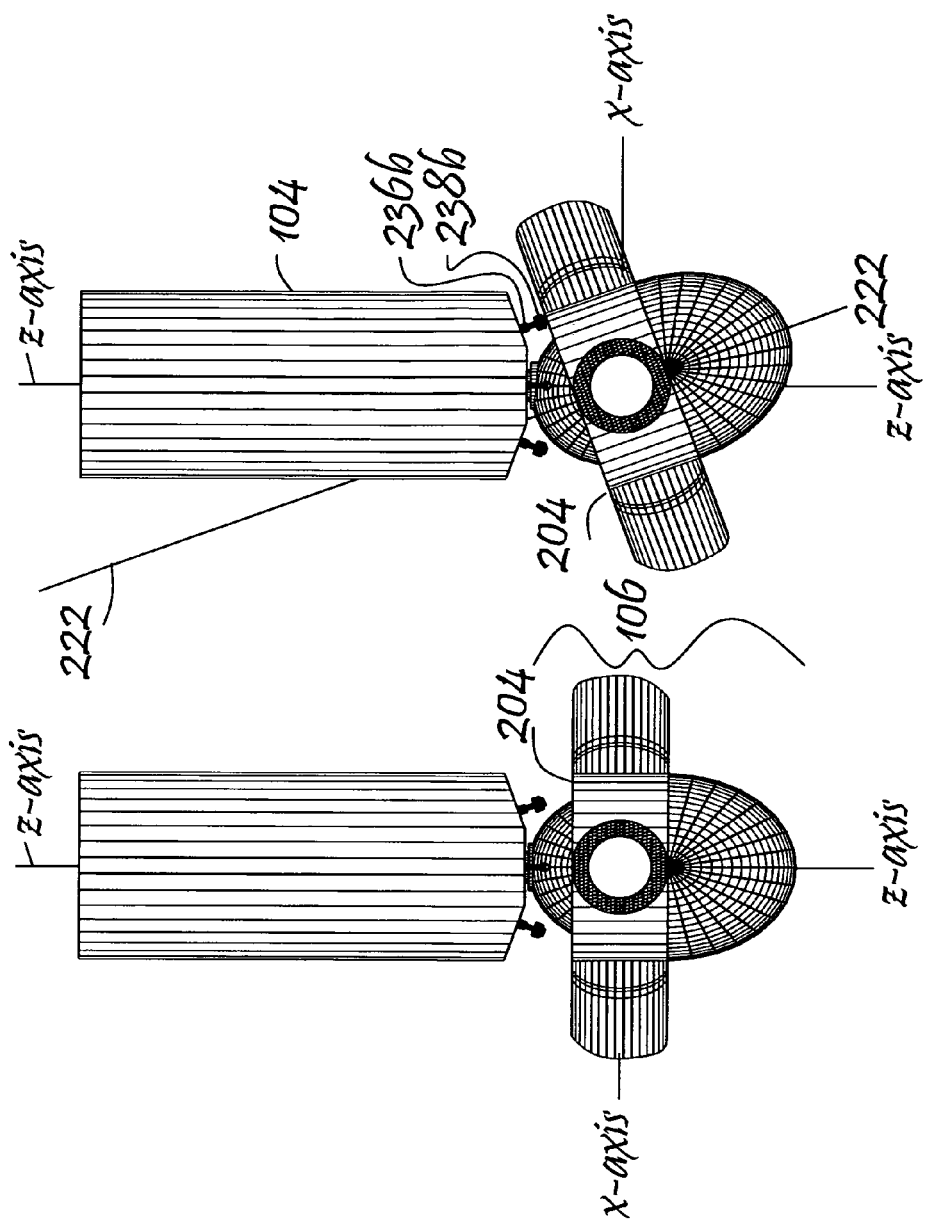
FIG. 20A is a top view of the rotor and nacelle without rotation about the y-axis.
FIG. 20B is a top view of the rotor and nacelle with rotation about the y-axis.

Optional features of either of the preferred embodiments can also include a nose cone 248 and an inner hub protector 250. FIG. 17 shows a side view of the nose cone 248 and the inner hub protector 250 with the ball-and-socket hub 200 removed for clarity. The nose cone 248 attaches to the front surface of the hub socket 204 (FIG. 2A). The inner hub protector 250 fits over the main shaft 112 at the center and is attached to the back surface of the hub 200 at the outer perimeter. The nose cone 248 and inner hub protector 250 together create a seal that protects the ball and socket from the environment. Connection of the nose cone 248 and the inner hub protector is shown in FIG. 19. The inner hub protector 250 is constructed of a flexible material (e.g., rubber) that allows for movement of the hub socket 204 with respect to the main shaft 112, as shown in FIGS. 20A and 20B. A seal that protects the ball-and-socket hub 200 (FIG. 2A) from the environment would most likely be used in dusty and/or damp environments.

Figure 18:
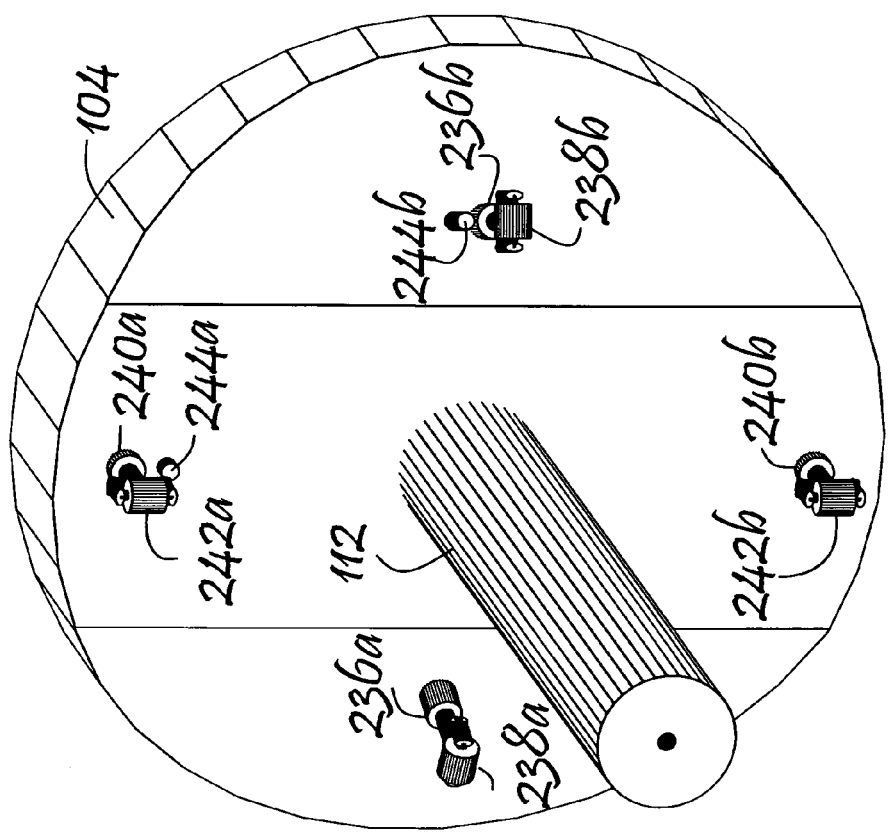
FIG. 18 is a perspective view of the front of the nacelle with the back portion removed for clarity.

For any of the preferred embodiments, FIG. 18 shows the front of the nacelle 104 with the back portion removed for clarity. The figure shows the main shaft 112 extending forward. The figure shows the ends of two horizontal linear actuators 236a and 236b that are positioned along the x-axis within the nacelle 104. A horizontal wheel is located at the end of each horizontal linear actuator, 238a and 238b. The figure also shows the ends of two vertical linear actuators 240a and 240b that are positioned along the y-axis within the nacelle 104 with a vertical wheel located at the end of each vertical linear actuator, 242a and 242b. FIG. 18 also shows the end of a vertical laser measuring device 244a positioned along the y-axis and the end of a horizontal laser measuring device 244b positioned along the x-axis. The laser measuring devices 244a 244b read the distances to the back of the hub 200 and relay these measurements into a microprocessor 126 to determine the plane of rotation of the hub 200. Based upon this information, the microprocessor 126 can change the plane of rotation by sending a signal to extend one or more of the linear actuators 236a 236b 240a 240b so as to push the back of the hub 200 with the wheels 238a 238b 242a 242b until the desired plane of rotation is achieved.

The linear actuators 236a 236b 240a 240b also provide a stop for the movement of the hub socket 204 within the desired range of motion. In the present invention, the rotation limits around the y-axis are ±20°. The linear actuators 236a 236b 240a 240b are also used during start up and shut down in order to assure that the blades 110 do not strike the tower 102 or nacelle 104. In this case, all linear actuators 236a 236b 240a 240b would be extended fully to position the hub socket 204 perpendicular to the main shaft 112. After startup, the linear actuators 236a 236b 240a 240b can be moved back to avoid unnecessary contact of the wheels 238a 238b 242a 242b with the back surface of the hub 200.

FIG. 19, which is a side view of either of the preferred embodiments, shows the vertical cylindrical tower 102, a horizontal cylindroidal nacelle 104 and a rotor 106. The rotor 106 comprises a ball-and-socket hub 200, from which extend two or more blades 110, a nose cone 248, and a flexible inner hub protector 250. The nacelle 104 is mounted on a tower 102 that can be rotated around the yaw axis 118 using yaw drive 122. FIG. 19 shows the y-axis which is parallel to the yaw axis 118.

FIGS. 20A and 20B show two views of the top of the apparatus along with the x-axis and the z-axis. FIG. 20A shows an alignment of the rotor 106 with the z-axis. In this configuration, the magnetic coupling would be aligned as shown in FIG. 12A. FIG. 20B shows a view where the rotor axis 222 is rotated 20° around the y-axis. In this configuration, the magnetic coupling would be aligned as shown in FIG. 12B, and the mechanical coupling aligned as shown in FIG. 16. FIGS. 20A and 20B show front of the nacelle 104 is angled with respect to the z-axis in order to accommodate rotation of the hub socket 204 around the y-axis. FIG. 20B shows contact with the hub socket 204 with the horizontal wheel 238b of the horizontal linear actuator 236b. The actuator 236b stops the hub 204 from rotating further in order to avoid damage to the nacelle 104. FIG. 20B shows the rotor 106 maintains symmetry with respect to the rotor axis 222 after rotating 20° that axis around the y-axis. The rotor 106 also maintains symmetry with respect to the z-axis because the z-axis and the rotor axis 222 intersect at the y-axis.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A horizontal wind turbine generator, comprising:

a vertical cylindrical tower, a horizontal cylindrical nacelle, and a rotor;

wherein the nacelle is rotably mounted on the tower, such that the nacelle can be rotated about a yaw axis, which axially extends vertically upward through the tower;

wherein the rotor comprises a hub, from which extend two or more blades, and the hub is axially connected to a main shaft, which can rotate about a main shaft axis extending outward from the main shaft, such that the action of a wind on the blades causes a wind-induced rotation of the rotor about a rotor axis and of the main shaft about the main shaft axis;

wherein the main shaft extends inwardly through the nacelle and transmissively connects through a gear box in the nacelle to a generator in the nacelle, such that the wind-induced rotation of the main shaft turns the generator and thereby generates electricity;

wherein the rotation of the nacelle about the yaw axis is controlled by a yaw drive so as to change the orientation of the main shaft axis;

wherein the hub comprises a main shaft ball, hub socket and outer hub, such that the main shaft ball is rigidly attached to the front end of the main shaft, and such that the blades extend outward from the outer hub, and such that blades have a pitch angle, which determines an angle of attack of the blades with respect to the wind direction;

wherein the main shaft ball is spherical and the hub socket has an inner surface which is a spherical shell; and wherein the hub socket slidably surrounds the main shaft ball, such that the wind-induced rotational motion of the hub socket is transmitted to the main shaft ball by multiple cooperating rotational transfer means in the main shaft ball and in the hub socket; and wherein the rotational transfer means are coupled either mechanically or magnetically;

wherein the rotational transfer means comprise multiple paired dynamic rotational couplers, one of which is a smaller coupler and one of which is a larger coupler; and wherein the dynamic rotational couplers comprise a first coupler and a second coupler; and wherein the first coupler is embedded in or affixed to the surface of the main shaft ball, and the second coupler is embedded in or affixed to the inner surface of the hub socket; and wherein either the first coupler or the second coupler can be the smaller coupler;

wherein the second coupler is free to rotate with respect to the first coupler around a wind shear axis, which is perpendicular to a gradient in wind speed and is located along a line connecting positions of maximum forward rotation and maximum backward rotation of the blades; thereby enabling the smaller coupler to move freely within the perimeter of the larger coupler; and wherein the second coupler is not free to rotate with respect to the first coupler around the main shaft axis, such that rotation of the second coupler around the main shaft axis is transferred to the first coupler, thereby transferring rotation of the hub socket to the main shaft ball;

wherein the dynamic rotational couplers permit the hub socket to rotate in relation to the main shaft ball about a wind shear axis; and wherein rotation of the hub socket with respect to the main shaft ball about the wind shear axis allows the blades of the rotor to move back-and-forth in response to wind shear forces, thereby maintaining a relatively constant tip speed ratio and angle of attack of the blades, so as to enable optimum conversion of wind energy to electrical energy;

wherein a back-and-forth rotation of the blades around the wind shear axis is transferred to a back-and-forth rotation of the hub socket around the wind shear axis; and wherein the rotation of the hub socket around the wind shear axis can cause the hub socket to rotate around a hub axis, which is an axis perpendicular to the wind shear axis and to the main shaft axis, such that the rotation of the hub socket around the hub axis occurs when wind shear causes the blades to apply an unbalanced torque around the wind shear axis;

wherein the rotation of the hub socket around the wind shear axis causes a change in the orientation of the rotor axis, such that the orientation of the rotor axis differs from the orientation of the main shaft axis, and such that the back-and-forth rotation of the dynamic rotational couplers enables the hub socket to rotate around the rotor axis, which has a different orientation than the main shaft axis; and wherein the rotation of the hub socket with respect to the main shaft ball about the wind shear axis and the hub axis allows the blades of the rotor to move back-and-forth about the wind shear axis and side-to-side about the hub axis in response to wind shear forces, thereby maintaining a relatively constant tip speed ratio and angle of attack of the blades, so as to enable optimum conversion of wind energy to electrical energy.

2. The horizontal wind turbine generator according to claim 1, wherein the dynamic rotational couplers are coupled by mechanical coupling means; wherein the mechanical coupling means comprise multiple coupling rods projecting from the inner surface of the hub socket that insertably and slidably cooperate with corresponding oblong longitudinal grooves in the outer surface of the main shaft ball; and wherein the longitudinal grooves have a slightly larger width than the diameter of coupling rods and have an elongated length in the direction of the main shaft axis, such that the coupling rods can traverse back and forth along the elongated length of the longitudinal grooves as the main shaft ball rotates about the main shaft axis, thereby enabling a rotation of the hub socket about the wind shear axis; and wherein the coupling rods engage with the sides of the oblong longitudinal grooves to transfer rotation from the hub socket rotating around the rotor axis to the main shaft ball rotating around the main shaft axis.

3. The horizontal wind turbine generator according to claim 1, wherein the dynamic rotational couplers are coupled by mechanical coupling means; and wherein the mechanical coupling means comprise multiple coupling rods projecting from the outer surface of the main shaft ball that insertably and slidably cooperate with corresponding oblong longitudinal grooves in the inner surface of the hub socket; and wherein the longitudinal grooves have a slightly larger width than the diameter of coupling rods and have an elongated length in the direction of the rotor axis, such that the coupling rods can traverse back and forth along the elongated length of the longitudinal grooves as the hub rotates about the wind shear axis, thereby enabling a rotation of the hub socket about the wind shear axis; and wherein the coupling rods engage with the sides of the oblong longitudinal grooves to transfer rotation from the hub socket rotating around the rotor axis to the main shaft ball rotating around the main shaft axis.

4. The horizontal wind turbine generator according to claim 1, wherein the dynamic rotational couplers are coupled by magnetic coupling means; and wherein the magnetic coupling means comprise multiple round socket magnets embedded in the inner surface of the hub socket that attractively and slidably cooperate with corresponding longitudinal ball magnets embedded in the outer surface of the main shaft ball; and wherein the round socket magnets and the longitudinal ball magnets have exposed poles of opposite and attracting polarity; and wherein the longitudinal ball magnets have approximately the same width as the diameter of the round socket magnets and have an elongated length in the direction of the main shaft axis, such that the round socket magnets can traverse back and forth along the elongated length of the longitudinal ball magnets as the hub rotates about the rotor axis, thereby enabling a rotation of the hub socket about the wind shear axis; and wherein a change in magnetic polarity at the elongated edges of the longitudinal ball magnets causes the round socket magnets to be aligned over the longitudinal ball magnets in order to maintain maximum magnetic attraction, thereby enabling rotational transfer from the hub socket rotating around the rotor axis to the main shaft ball rotating around the main shaft axis.

5. The horizontal wind turbine generator according to claim 1, wherein the dynamic rotational couplers are coupled by magnetic coupling means; and wherein the magnetic coupling means comprise multiple longitudinal socket magnets embedded in the inner surface of the hub socket that attractively and slidably cooperate with corresponding round ball magnets embedded in the outer surface of the main shaft ball; and wherein the longitudinal socket magnets and the round ball magnets have exposed poles of opposite and attracting polarity; and wherein the longitudinal socket magnets have approximately the same width as the diameter of the round ball magnets and have an elongated length in the direction of the rotor axis, such that the longitudinal socket magnets can traverse back and forth across the round ball magnets as the hub rotates about the rotor axis, thereby enabling a rotation of the hub socket about the wind shear axis; and wherein a change in magnetic polarity at the elongated edges of the longitudinal socket magnets causes the longitudinal socket magnets to be aligned over the round ball magnets in order to maintain maximum magnetic attraction, thereby enabling rotational transfer from the hub socket rotating around the rotor axis to the main shaft ball rotating around the main shaft axis.

6. The dynamic rotational couplers according to either claim 4 or claim 5, wherein the strength of the magnetic coupling means can be set to a value that limits the amount of torque that can be transferred from the hub socket to the main shaft ball, such that when the torque exceeds this limit, magnetic coupling between the socket magnets and the ball magnets is broken, thereby enabling the turbine blades to spin faster than the main shaft in cases where there are sudden strong gusts of wind that could possibly damage the generator.

7. The horizontal wind turbine generator according to any one of claims 1-5, wherein the hub further comprises a nose cone and an inner hub protector; and wherein the nose cone attaches to the front surface of the hub, and the inner hub protector fits over the main shaft and is attached to the back surface of the hub; and wherein the inner hub protector is made of a flexible material that allows the hub socket to move with respect to the main shaft; and wherein the nose cone and the inner hub protector together create a seal that surrounds and protects the hub.

8. The horizontal wind turbine generator according to any one of claims 1-5, wherein the nacelle further comprises multiple linear actuators and multiple laser measuring devices in the front face of the nacelle; and wherein each of the linear actuators has a rotary member, such that the laser measuring devices continuously monitor distances from horizontal and vertical locations on the nacelle's front face to the back of the hub so as to generate alignment data regarding the plane of rotation of the hub; and wherein the laser measuring devices transmit the alignment data to a microprocessor; and wherein, based on the alignment data, the microprocessor controls the extension and retraction of the rotary members of the linear actuators so that the rotary member(s) of the appropriate linear actuator(s) engage the back of the hub, thereby adjusting the plane of rotation of the hub socket.

9. The horizontal wind turbine generator according to claim 8, wherein the linear actuators also limit the movement of the hub socket within a desired range of motion and impose limits of the rotation of the hub socket about the hub axis in order to prevent damage caused by impact of the hub socket on the front face of the nacelle.

10. The horizontal wind turbine generator according to claim 9, wherein the rotary members of the linear actuators are fully extended during startup and shut down of the horizontal wind turbine generator in order to position the hub socket perpendicular to the main shaft so as to prevent the blades from striking the tower or the nacelle.

11. The horizontal wind turbine generator according to claim 7, wherein the nacelle further comprises multiple linear actuators and multiple laser measuring devices in the front face of the nacelle; and wherein each of the linear actuators has a rotary member, such that the laser measuring devices continuously monitor horizontal and vertical distances from the nacelle's front face to the back of the hub so as to generate alignment data regarding the plane of rotation of the hub; and wherein the laser measuring devices transmit the alignment data to a microprocessor; and wherein, based on the alignment data, the microprocessor controls the extension and retraction of the rotary members of the linear actuators so that the rotary members of some of the linear actuators engage the back of the hub and the rotary members of other linear actuators disengage from the back of the hub, thereby adjusting the plane of rotation of the hub socket.

12. The horizontal wind turbine generator according to claim 11, wherein the linear actuators also limit the movement of the hub socket within a desired range of motion and impose limits of the rotation of the hub socket about the hub axis in order to prevent damage caused by impact of the hub socket on the front face of the nacelle.

13. The horizontal wind turbine generator according to claim 12, wherein the rotary members of the linear actuators are fully extended during startup and shut down of the horizontal wind turbine generator in order to position the hub socket perpendicular to the main shaft so as to prevent the blades from striking the tower or the nacelle.

* * * * *